US009699679B2

United States Patent
Sirotkin et al.

(10) Patent No.: US 9,699,679 B2
(45) Date of Patent: Jul. 4, 2017

(54) APPARATUS, SYSTEM AND METHOD OF CELLULAR NETWORK COMMUNICATIONS CORRESPONDING TO A NON-CELLULAR NETWORK

(71) Applicant: Intel Corporation, Santa Clara, CA (US)

(72) Inventors: Alexander Sirotkin, Giv'on Hachadasha (IL); Mo-Han Fong, Sunnyvale, CA (US); Nageen Himayat, Fremont, CA (US); Shilpa Talwar, Los Altos, CA (US); Shu-Ping Yeh, Mountain View, CA (US)

(73) Assignee: INTEL CORPORATION, Santa Clara, CA (US)

( * ) Notice: Subject to any disclaimer, the term of this patent is extended or adjusted under 35 U.S.C. 154(b) by 61 days.

(21) Appl. No.: 14/068,221

(22) Filed: Oct. 31, 2013

(65) Prior Publication Data

US 2014/0161103 A1     Jun. 12, 2014

Related U.S. Application Data

(60) Provisional application No. 61/721,436, filed on Nov. 1, 2012, provisional application No. 61/771,698, filed on
(Continued)

(51) Int. Cl.
*H04W 24/10*     (2009.01)
*H04W 84/12*     (2009.01)
*H04W 88/06*     (2009.01)

(52) U.S. Cl.
CPC ............ *H04W 24/10* (2013.01); *H04W 84/12* (2013.01); *H04W 88/06* (2013.01)

(58) Field of Classification Search
CPC ...... H04W 24/10; H04W 84/12; H04W 88/06
See application file for complete search history.

(56) References Cited

U.S. PATENT DOCUMENTS 7,212,837 B1     5/2007 Calhoun et al.
7,965,693 B2 *   6/2011 Jiang et al. .................. 370/338
(Continued)

FOREIGN PATENT DOCUMENTS

CN     101167392 B     6/2012
EP     1753253         2/2007
(Continued)

OTHER PUBLICATIONS

International Search Report and Written Opinion for PCT Patent Application No. PCT/US2013/064761, mailed on Jan. 20, 2014, 11 pages.
(Continued)

*Primary Examiner* — Mohammad Anwar
*Assistant Examiner* — Kokou R Detse
(74) *Attorney, Agent, or Firm* — Shichrur & Co.

(57) ABSTRACT

Some demonstrative embodiments include devices, systems and/or cellular network communications corresponding to a non-cellular network. For example, an Evolved Node B (eNB) may be configured to transmit to a User Equipment (UE) at least one configuration message to configure one or more measurements to be performed by the UE with respect to at least Wireless-Local-Area-Network (WLAN), to receive from the UE at least one report message including measurement information corresponding to the WLAN, to trigger the UE to start or stop offloading to the WLAN, and/or to transmit to the UE network assistance information corresponding to the WLAN.

23 Claims, 5 Drawing Sheets

Related U.S. Application Data on Mar. 1, 2013, provisional application No. 61/808,597, filed on Apr. 4, 2013.

(56) References Cited

U.S. PATENT DOCUMENTS

| | | | |
|---|---|---|---|
| 8,112,087 B2* | 2/2012 | Jeong et al. | 455/436 |
| 8,467,351 B2* | 6/2013 | Liu et al. | 370/332 |
| 8,774,039 B2* | 7/2014 | Hirano et al. | 370/252 |
| 8,842,633 B2* | 9/2014 | Dwyer | H04W 36/0083 370/338 |
| 8,918,096 B2* | 12/2014 | Drazynski et al. | 455/422.1 |
| 2004/0082327 A1 | 4/2004 | Kim et al. | |
| 2004/0165563 A1* | 8/2004 | Hsu | H04W 48/18 370/338 |
| 2004/0202140 A1 | 10/2004 | Kim et al. | |
| 2004/0248605 A1 | 12/2004 | Cao et al. | |
| 2005/0153692 A1 | 7/2005 | Hwang et al. | |
| 2005/0164719 A1 | 7/2005 | Waters | |
| 2005/0210154 A1* | 9/2005 | Verma | H04W 92/02 709/249 |
| 2005/0254469 A1* | 11/2005 | Verma | H04W 36/0022 370/338 |
| 2005/0255851 A1 | 11/2005 | Schreiber | |
| 2006/0018284 A1* | 1/2006 | Rudolf | H04L 12/24 370/332 |
| 2006/0189331 A1 | 8/2006 | Lundsjo et al. | |
| 2006/0223567 A1 | 10/2006 | Kwak et al. | |
| 2007/0060067 A1* | 3/2007 | Ruuska | H04B 17/0087 455/67.11 |
| 2007/0097918 A1 | 5/2007 | Cai et al. | |
| 2008/0207195 A1* | 8/2008 | Ranta | H04W 24/10 455/423 |
| 2010/0144363 A1 | 6/2010 | Da Rosa et al. | |
| 2010/0317315 A1* | 12/2010 | Burbidge | H04W 36/0022 455/404.1 |
| 2010/0323698 A1 | 12/2010 | Rune et al. | |
| 2011/0058531 A1* | 3/2011 | Jain et al. | 370/331 |
| 2011/0176414 A1* | 7/2011 | De Franca Lima | H04L 47/12 370/230 |
| 2011/0188472 A1 | 8/2011 | Jeon et al. | |
| 2011/0222523 A1 | 9/2011 | Fu et al. | |
| 2011/0306386 A1 | 12/2011 | Centoza et al. | |
| 2012/0100853 A1 | 4/2012 | Xiong et al. | |
| 2012/0113843 A1* | 5/2012 | Watfa | H04W 72/1289 370/252 |
| 2012/0294215 A1 | 11/2012 | Ekici et al. | |
| 2012/0295624 A1 | 11/2012 | Tang | |
| 2012/0300759 A1* | 11/2012 | Patanapongpibul | H04W 48/14 370/338 |
| 2013/0083661 A1* | 4/2013 | Gupta | H04W 4/005 370/235 |
| 2013/0083722 A1 | 4/2013 | Bhargava et al. | |
| 2013/0083783 A1 | 4/2013 | Gupta et al. | |
| 2013/0163424 A1 | 6/2013 | Goerke et al. | |
| 2013/0163463 A1 | 6/2013 | Grayson et al. | |
| 2013/0242965 A1* | 9/2013 | Horn | H04W 24/10 370/338 |
| 2013/0250834 A1* | 9/2013 | Seok et al. | 370/311 |
| 2013/0308445 A1 | 11/2013 | Xiang et al. | |
| 2013/0322238 A1 | 12/2013 | Sirotkin | |
| 2014/0003239 A1 | 1/2014 | Etemad et al. | |
| 2014/0043966 A1 | 2/2014 | Lee et al. | |
| 2014/0050086 A1 | 2/2014 | Himayat et al. | |
| 2014/0066054 A1 | 3/2014 | Jung et al. | |
| 2014/0092742 A1 | 4/2014 | Chou | |
| 2014/0112170 A1 | 4/2014 | Zhou et al. | |
| 2014/0133294 A1 | 5/2014 | Horn et al. | |
| 2014/0133304 A1 | 5/2014 | Pica et al. | |
| 2014/0153511 A1 | 6/2014 | Sirotkin | |
| 2014/0200008 A1 | 7/2014 | Wang et al. | |
| 2014/0302853 A1 | 10/2014 | Militano et al. | |
| 2015/0382281 A1 | 12/2015 | Sirotkin | |
| 2016/0014667 A1 | 1/2016 | Sirotkin et al. | |
| 2016/0020890 A1 | 1/2016 | Sirotkin et al. | |

FOREIGN PATENT DOCUMENTS

| | | |
|---|---|---|
| EP | 2389030 | 11/2011 |
| JP | 2005184824 | 7/2005 |
| JP | 2011015327 | 1/2011 |
| KR | 20060084002 | 7/2006 |
| KR | 20110126913 | 11/2011 |
| KR | 20120005508 | 1/2012 |
| TW | 200723922 A | 6/2007 |
| TW | 201146046 A | 12/2011 |
| WO | 2008084621 | 7/2008 |
| WO | 2011110108 | 9/2011 |
| WO | 2012121757 | 9/2012 |

OTHER PUBLICATIONS

ETSI TS 136 300 V11.3.0 (Nov. 2012), LTE; Evolved Universal Terrestrial Radio Access (E-UTRA) and Evolved Universal Terrestrial Radio Access Network (E-UTRAN); Overall description; Stage 2 (3GPP TS 36.300 version 11.3.0 Release 11), 217 pages.

ETSI TS 136 331 V10.7.0 (Nov. 2012), LTE; Evolved Universal Terrestrial Radio Access (E-UTRA); Radio Resource Control (RRC); Protocol specification (3GPP TS 36.331 version 10.7.0 Release 10), 307 pages.

3GPP TSG-RAN Meeting #57, RP-1201455, "WLAN/3GPP Radio Interworking", Sep. 13-15, 2012, 5 pages.

3GPP TS 23.401 V10.7.0 (Mar. 2012), 3rd Generation Partnership Project; Technical Specification Group Services and System Aspects; General Packet Radio Service (GPRS) enhancements for Evolved Universal Terrestrial Radio Access Network (E-UTRAN) access (Release 10), 278 pages.

ETSI TS 136 413 V11.1.0 (Oct. 2012), LTE; Evolved Universal Terrestrial Radio Access Network (E-UTRAN); S1 Application Protocol (S1AP) (3GPP TS 36.413 version 11.1.0 Release 11), 270 pages.

3GPP TS 36.423 V11.0.0 (Mar. 2012), 3rd Generation Partnership Project; Technical Specification Group Radio Access Network; Evolved Universal Terrestrial Radio Access Network (E-UTRAN); X2 application protocol (X2AP) (Release 11), 134 pages.

IEEE Std 802.111™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012.

Wi-Fi Alliance Technical Committee P2P Task Group; Wi-Fi Peer-to-Peer (P2P) Technical Specification; Version 1.2; Dec. 14, 2011; 160 pages.

3GPP RWS-120010, "Requirements, Candidate Solutions & Technology Roadmap for LTE Rel-12 Onward," NTT DOCOMO, Inc, Jun. 2012, 27 pages.

3GPP TSG RAN2 Meeting #81, R2-130887, "TR 37.8xx v0.1.0 on Study on WLAN/3GPP Radio Interworking", Feb. 2013, 9 pages.

3GPP TS 25.433 V11.1.0 (Jun. 2012), 3rd Generation Partnership Project; Technical Specification Group Radio Access Network; UTRAN Iub interface Node B Application Part (NBAP) signalling (Release 11), Jun. 2012, 1336 pages.

3GPP TS 25.331 V10.9.0 (Sep. 2012), 3rd Generation Partnership Project; Technical Specification Group Radio Access Network; Radio Resource Control (RRC); Protocol specification (Release 10), Sep. 2012, 1984 pages.

International Search Report and Written Opinion for PCT Patent Application No. PCT/US2013/077905, mailed on Feb. 28, 2014, 10 pages.

Office Action for Taiwanese Patent Application No. 103112548, mailed on May 25, 2015, 12 pages, including 1 page of English translation.

(56) References Cited

OTHER PUBLICATIONS

International Preliminary Report on Patentability and Written Opinion for International Application No. PCT/US2013/064761, mailed on Jul. 30, 2015, 8 pages.
International Preliminary Report on Patentability for PCT/US2013/077905, mailed on Oct. 15, 2015, 7 pages.
Office Action for U.S. Appl. No. 14/093,476, mailed on Jun. 8, 2015, 21 pages.
Office Action for U.S. Appl. No. 14/129,295, mailed on Apr. 7, 2016, 14 pages.
Office Action for Japanese Patent Application No. 2015-547932, mailed on Aug. 9, 2016, 8 pages (Including 4 pages of English translation.).
Office Action for Korean Patent Application Serial No. 2015-7015916, mailed on Mar. 24, 2016, 12 pages.(Including 6 pages of English translation.).
Notice of Allowance for U.S. Appl. No. 14/093,476, mailed on Mar. 28, 2016, 30 pages.
Office Action for U.S. Appl. No. 14/129,295, mailed on Oct. 28, 2015, 18 pages.
Final Office Action for U.S. Appl. No. 14/093,476, mailed on Oct. 28, 2015, 33 pages.
3GPP TS 25.433, Universal Mobile Telecommunications System (UMTS); UTRAN lub interface Node B Application Part (NBAP) Signaling, version 11.3.0 Release 11, Feb. 2013, 1328 pages.
3GPP TS 25.331: 3rd Generation Partnership Project; Technical Specification Group Radio Access Network; Radio Resource Control (RRC); Protocol specification (Release 10), V10.11.0, Mar. 2013, 1897 pages.
Office Action for Taiwanese Patent Application No. 103112288, mailed on Nov. 20, 2015, 19 pages, including 9 page of English translation.
International Search Report and Written Opinion for PCT Patent Application No. PCT/US2013/077906, mailed on Feb. 28, 2014, 10 pages.
International Preliminary Report on Patentability for International Application No. PCT/US2013/077906, mailed on Oct. 15, 2015, 7 pages.
Office Action for Korean Patent Application No. 10-2015-7015916, mailed on Sep. 26, 2016, 7 pages, (Including 3 pages of English translation).
Extended European Search Report for Patent Application No. 13881363.9, mailed on Nov. 23, 2016, 14 pages.

"3rd Generation Partnership Project; Technical Specification Group Radio Access Network; UTRAN functions, examples on signalling procedures (Release 11)", 3GPP Draft; 25931-B00, 3rd Generation Partnership project (3GPP), Mobile Competence Centre ; 650, Route Des Lucioles ; F-06921 Sophia-Antipolis Cedex ; France, Sep. 22, 2012. 130 pages.
ETRI: "Requirements for WLAN/3GPP radio interworking", 3GPP Draft; R2-130331 Requirements for WLAN-3GPP Radio Interworking (ETRI), 3rd Generation Partnership Project (3GPP), Mobile Competence Centre ; 650, Route Des Lucioles ; F-06921 Sophia-Antipolis Ced j vol. RAN WG2, No. St. Julian; Jan. 28, 2013-Feb. 1, 2013, Jan. 18, 2013, 2 pages.
European Search Report for European Patent Application No. 13881212.8 mailed on Sep. 15, 2016, 8 pages.
European Search Report for European Patent Application No. 13872198.0 mailed on Sep. 22, 2016, 10 pages.
Huawei: "WLAN network selection enhancement", 3GPP Draft; R2-131366 WLAN Network Selection Enhancement, 3rd Generation Partnership Project (3GPP), Mobile Competence Centre ; 650, Route Des Lucioles ; F-06921 Sophia-Antipolis Cedex ; France, vol. RAN WG2, No. Chicago, U.S.A.; Apr. 15, 2013-Apr. 19, 2013, Apr. 5, 2013, 3 pages.
CMCC: "Scenarios and Requirements on WLAN/3GPP Radio Interworking", [Online], 3GPP Draft; R2-130086 Scenarios and Requirements on WLANJ3GPP Radio Interworking, 3rd Generation Partnership Project (3GPP), Mobile Competence Centre ; 650, Route Des Lucioles ; F-06921 SophiaAntipolis Cedex ; France, Jan. 18, 2013, 4 pages.
Qualcomm Incorporated: "WLAN/3GPP Radio Interworking Scope and Scenarios", [Online] Jan. 18, 2013 (Jan. 18, 2013), 3GPP Draft; R2-130264 WLAN Interworking Scenarios, 3rd Generation Partnership Project (3GPP), Mobile Competence Centre ; 650, Route Des Lucioles ; F-06921 SophiaAntipolis Cedex ; France, Jan. 18, 2013, 3 pages.
LG Electronics Inc: "Comparison of access network selection Solutions", 3GPP Draft; R2-132055 Comparison of Access Network Selection Solutions, 3rd Generation Partnership Project (3GPP), Mobile Competence Centre ; 650, Route Des Lucioles ; F-06921 Sophia-Antipolis Cedex vol. RAN WG2, No. Fukuoka, Japan; May 20, 2013-May 24, 2013, May 11, 2013, 6 pages.
Office Action for Japanese Patent Application No. 2015-547932, mailed on Dec. 13, 2016, 7 pages (Including 4 pages of English translation).
Office Action for U.S. Appl. No. 14/772,495 mailed on Apr. 13, 2017, 60 pages.

* cited by examiner

APPARATUS, SYSTEM AND METHOD OF CELLULAR NETWORK COMMUNICATIONS CORRESPONDING TO A NON-CELLULAR NETWORK

CROSS REFERENCE

This application claims the benefit of and priority from U.S. Provisional Patent Application No. 61/721,436 entitled "Advanced Wireless Communication Systems and Techniques", filed Nov. 1, 2012, U.S. Provisional Patent Application No. 61/771,698 entitled "Advanced Wireless Communication Systems and Techniques", filed Mar. 1, 2013, and U.S. Provisional Patent Application No. 61/808,597 entitled "Advanced Wireless Communication Systems and Techniques", filed Apr. 4, 2013, the entire disclosures of all of which are incorporated herein by reference.

TECHNICAL FIELD

Some embodiments described herein generally relate to cellular network communications corresponding to a non-cellular network.

BACKGROUND

A wireless communication device, e.g., a mobile device, may be configured to utilize multiple wireless communication technologies.

For example, a User Equipment (UE) device may be configured to utilize a cellular connection, e.g., a Long Term Evolution (LTE) cellular connection, as well as a wireless-local-area-network (WLAN) connection, e.g., a Wireless-Fidelity (WiFi) connection.

The UE may be configured to automatically utilize a WiFi connection, for example, as long as a Wi-Fi signal received by the UE is strong enough.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
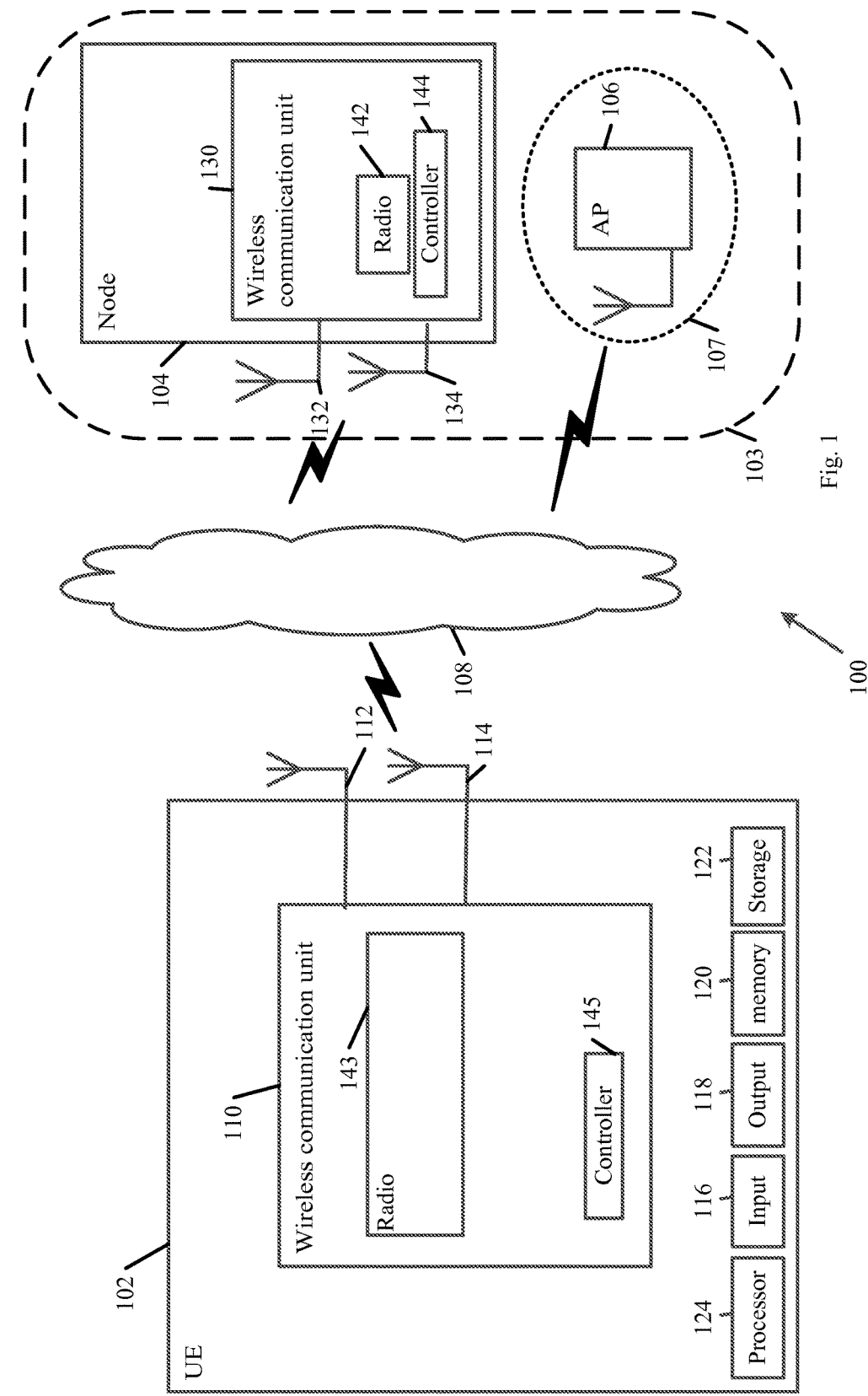
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a cellular network, a cellular node, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications (including "*RAN2 RRC—3GPP TS* 36.331: *Evolved Universal Terrestrial Radio Access (E-UTRA)*; *Radio Resource Control (RRC)*; *Protocol specification*"; "RAN3×2—*3GPP TS* 36.423: Evolved Universal Terrestrial Radio Access Network (E-UTRAN); X2 Application Protocol (X2AP)"; 3GPP TS 23.401 General Packet Radio Service (GPRS) enhancements for Evolved Universal Terrestrial Radio Access Network (E-UTRAN) access"; and "3GPP TS 36.413 Evolved Universal Terrestrial Radio Access Network (E-UTRAN); S1 Application Protocol (S1AP)") and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, April 2011, Final specification) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11: *Wireless LAN Medium Access Control (MAC) and Physical Layer (PHY) Specifications,* Mar. 29, 2012), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16e, 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments are described herein with respect to a LTE cellular system. However, other embodiments may be implemented in any other suitable cellular network, e.g., a 3G cellular network, a 4G cellular network, a 5G cellular network, a WiMax cellular network, and the like.

Some demonstrative embodiments are described herein with respect to a WLAN system. However, other embodiments may be implemented in any other suitable non-cellular network.

Some demonstrative embodiments may be used in conjunction with a Heterogeneous Network (HetNet), which may utilize a deployment of a mix of technologies, frequencies, cell sizes and/or network architectures, e.g., including cellular, mmWave, and/or the like. In one example, the HetNet may include a radio access network having layers of different-sized cells ranging from large macrocells to small cells, for example, picocells and femtocells.

Other embodiments may be used in conjunction with any other suitable wireless communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

The phrase "access point" (AP), as used herein, may include an entity that includes a station (STA) and provides access to distribution services, via the Wireless Medium (WM) for associated STAs.

The term "station" (STA), as used herein, may include any logical entity that is a singly addressable instance of a medium access control (MAC) and a physical layer (PHY) interface to the WM.

The phrases "directional multi-gigabit (DMG)" and "directional band" (DBand), as used herein, may relate to a frequency band wherein the Channel starting frequency is above 56 GHz.

The phrases "DMG STA" and "mmWave STA (mSTA)" may relate to a STA having a radio transmitter, which is operating on a channel that is within the DMG band.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums 108. For example, system 100 may include at least one User Equipment (UE) 102 capable of communicating with one or more wireless communication networks, e.g., as described below.

Wireless mediums 108 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, system 100 may include at least one cellular network 103, e.g., a cell controlled by a node 104.

In some demonstrative embodiments, system 100 may include a non-cellular network 107, for example, a WLAN, e.g., a Basic Service Set (BSS), managed by an Access Point (AP) 106.

In some demonstrative embodiments, non-cellular network 107 may at least partially be within a coverage area of node 104. For example, AP 106 may be within a coverage area of node 104.

In some demonstrative embodiments, node 104 may include an Evolved Node B (eNB). For example, node 104 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations.

In other embodiments, node 104 may include any other functionality and/or may perform the functionality of any other cellular node, e.g., a Node B (NB), a base station or any other node or device.

In some demonstrative embodiments, UE 102 may include, for example, a mobile computer, a laptop computer, a notebook computer, a tablet computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, UE 102, node 104 and/or AP 106 may include one or more wireless communication units to perform wireless communication between UE 102, node 104, AP 106 and/or with one or more other wireless communication devices, e.g., as described below. For example, UE 102 may include a wireless communication unit 110 and/or node 104 may include a wireless communication unit 130.

In some demonstrative embodiments, wireless communication units 110 and 130 may include, or may be associated with, one or more antennas. In one example, wireless communication unit 110 may be associated with at least two antennas, e.g., antennas 112 and 114, or any other number of antennas, e.g., one antenna or more than two antennas; and/or wireless communication unit 130 may be associated with at least two antennas, e.g., antennas 132 and 134, or any other number of antennas, e.g., one antenna or more than two antennas.

In some demonstrative embodiments, antennas 112, 114, 132 and/or 134 may include any type of antennas suitable for transmitting and/or receiving wireless communication signals, blocks, frames, transmission streams, packets, messages and/or data. For example, antennas 112, 114,132 and/or 134 may include any suitable configuration, structure and/or arrangement of one or more antenna elements, components, units, assemblies and/or arrays. For example, antennas 112, 114, 132 and/or 134 may include a phased array antenna, a dipole antenna, a single element antenna, a set of switched beam antennas, and/or the like.

In some embodiments, antennas 112, 114, 132 and/or 134 may implement transmit and receive functionalities using separate transmit and receive antenna elements. In some embodiments, antennas 112, 114, 132 and/or 134 may implement transmit and receive functionalities using common and/or integrated transmit/receive elements.

In some demonstrative embodiments, wireless communication unit 130 may include at least one radio 142 and at least one controller 144 to control communications performed by radio 142, and/or wireless communication unit 110 may include at least one radio 143 and at least one controller 145 to control communications performed by radio 143. For example, radios 142 and/or 143 may include one or more wireless transmitters, receivers and/or transceivers able to send and/or receive wireless communication signals, RF signals, frames, blocks, transmission streams, packets, messages, data items, and/or data.

In some demonstrative embodiments, radios 142 and/or 143 may include a multiple input multiple output (MIMO) transmitters receivers system (not shown), which may be capable of performing antenna beamforming methods, if desired. In other embodiments, radios 142 and/or 143 may include any other transmitters and/or receivers.

In some demonstrative embodiments, radios 142 and/or 143 may include a turbo decoder and/or a turbo encoder (not shown) for encoding and/or decoding data bits into data symbols, if desired. In other embodiments, radios 142 and/or 143 may include any other encoder and/or decode.

In some demonstrative embodiments, radios 142 and/or 143 may include OFDM and/or SC-FDMA modulators and/or demodulators (not shown) configured to communicate OFDM signals over downlink channels, e.g., between node 104 and UE 102, and SC-FDMA signals over uplink channels, e.g., between UE 102 and node 104. In other embodiments, radios 142 and/or 143 may include any other modulators and/or demodulators.

In some demonstrative embodiments, wireless communication unit 110 may establish a WLAN link with AP 106. For example, wireless communication unit 110 may perform the functionality of one or more STAs, e.g., one or more WiFi STAs, WLAN STAs, and/or DMG STAs. The WLAN link may include an uplink and/or a downlink. The WLAN downlink may include, for example, a unidirectional link from AP 106 to the one or more STAs or a unidirectional link from a Destination STA to a Source STA. The uplink may include, for example, a unidirectional link from a STA to AP 106 or a unidirectional link from the Source STA to the Destination STA.

In some demonstrative embodiments, UE 102, node 104 and/or AP 106 may also include, for example, one or more of a processor 124, an input unit 116, an output unit 118, a memory unit 120, and a storage unit 122. UE 102, node 104 and/or AP 106 may optionally include other suitable hardware components and/or software components. In some demonstrative embodiments, some or all of the components of one or more of UE 102, node 104 and/or AP 106 may be enclosed in a common housing or packaging, and may be interconnected or operably associated using one or more wired or wireless links. In other embodiments, components of one or more of UE 102, node 104 and/or AP 106 may be distributed among multiple or separate devices.

Processor 124 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 124 executes instructions, for example, of an Operating System (OS) of UE 102, node 104 and/or AP 106 and/or of one or more suitable applications.

Input unit 116 includes, for example, a keyboard, a keypad, a mouse, a touch-screen, a touch-pad, a track-ball, a stylus, a microphone, or other suitable pointing device or input device. Output unit 118 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 120 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 122 includes, for example, a hard disk drive, a floppy disk drive, a Compact Disk (CD) drive, a CD-ROM drive, a DVD drive, or other suitable removable or non-removable storage units. Memory unit 120 and/or storage unit 122, for example, may store data processed by UE 102, node 104 and/or AP 106.

In some demonstrative embodiments, UE 102 may be configured utilize a cellular connection, e.g., a Long Term Evolution (LTE) cellular connection, a Universal Mobile Telecommunications System (UMTS) connection or any other cellular connection, to communicate with node 104, and a WLAN connection, e.g., a Wireless-Fidelity (WiFi) connection or any other WLAN connection, to communicate with AP 106.

In some demonstrative embodiments, one or more elements of system 100 may perform the functionality of a HetNet, which may utilize a deployment of a mix of technologies, frequencies, cell sizes and/or network architectures, for example, including cellular, WLAN, and/or the like.

For example, the HetNet may be configured to provide a service through a first wireless communication environment, e.g., a cellular network, and to maintain the service when switching to another communication environment, e.g., WLAN. The HetNet architecture may enable utilizing a mixture of wireless communication environments, e.g., a WLAN environment and a cellular environment, for example, to optimally respond to rapid changes in customer demand, reduce power consumption, reduce cost, increase efficiency and/or achieve any other benefit.

In one example, system 100 may utilize a Multi-tier, Multi-Radio Access Technology (Multi-RAT) Het-Net architecture, including a tier of small cells, e.g., pico, femto, relay stations, WiFi APs, and the like, overlaid on top of a macro cellular deployment to augment network capacity.

In another example, system 100 may utilize Multi-RAT small cells integrating multiple radios such as WiFi and 3GPP air interfaces in a single infrastructure device.

In other embodiments, system 100 may implement any other architecture and/or deployment.

In some demonstrative embodiments, utilizing the WLAN connection as a default connection, e.g., as long as UE 102 receives from AP 106 a strong enough signal, may result in an increase in the congestion of the WLAN, e.g., if a large number of UEs connect by default to the same AP, which in turn may result in a decrease of throughput over the WLAN connection between UE 102 and AP 106.

In some demonstrative embodiments, UE 102, node 104 and/or AP 106 may be configured to enable selective connection of UE 102 to the WLAN or the cellular network, for example, based on one or more criteria and/or parameters, e.g., as described in detail below.

In some demonstrative embodiments, the selective connection between UE 102 and node 104 or AP 106 may enable, for example, load balancing between the WLAN and the cellular network.

In some demonstrative embodiments, UE 102, node 104 and/or AP 106 may be configured to enable a network-centric (also referred to as "network controlled") access network selection scheme, in which node 104 and/or one or more other cellular network elements select an access network to be utilized by UE 102. For example, node 104 may be configured to control access network selection for UE 102.

In one example, node 104 may be configured to selectively trigger UE 102 to start or stop offloading to a WLAN, for example, the WLAN controlled by AP 106, e.g., as described below.

In some demonstrative embodiments, UE 102, node 104 and/or AP 106 may be configured to enable a UE-centric (also referred to as "UE controlled") access network selection scheme, in which UE 102 may select an access network to be utilized by UE 102. For example, UE 102 may select the access network based on network assistance information, which may be received from node 104 and/or based on any other information and/or criteria from any other element of system 100, e.g., as described below.

In some demonstrative embodiments, cooperation between cellular networks and WLAN networks, e.g., between node 104 and AP 106, may enable making network assignment decisions which maximize overall system performance, e.g., in terms of load, throughput, and the like. Additionally or alternatively, the cellular networks and WLAN networks may cooperate to provide optimal network assistance information, which may enable steering users towards decisions that improve system-wide performance.

However, some systems, e.g., deployments for multi-RAT Het-Nets, may include distributed deployments wherein components of the cellular network, e.g., node 104, and components of the non-cellular network, e.g., AP 106, may not necessarily be co-located and/or may not necessarily have direct network interfaces, e.g., a network interface between cell 103 and AP 106 may not exist. There may be minimal or even no degree of cooperation between distributed cells and/or networks and, as a result, the efficacy of network assistance transmitted to UE 102 may be limited.

Additionally or alternatively, cell selection schemes for distributed deployments, which may be based on power and/or signal strength metrics, e.g., Signal-to-Interference-Plus-Noise Ratio (SINR) or Received Signal Strength Indication (RSSI), may not fully account of network loading or performance conditions.

In some demonstrative embodiments, network assistance information may include or may be provided in the form of "network load", which may improve UE-based network selection. Additionally or alternately, a level of cooperation between the WLAN and cellular networks may be improved through UE assistance, wherein the UEs can measure local information from other cells in their vicinity and make the information available to the distributed cells in the network.

Some demonstrative embodiments may include mechanisms, which may improve network selection and/or association, for example, for distributed multi-RAT Het-Net deployments or any other systems. For example, system 100 may include a WLAN deployment within an operator managed heterogeneous network, for example, wherein there are limited or even no standardized network interfaces between node 104 and AP 106. According to these embodiments, node 104 and AP 106 may cooperate through UE assistance ("the UE-assisted network selection"), e.g., by UE 102.

In some demonstrative embodiments, the UE-assisted network selection may enable movement of UE 102 to and from WLAN and cellular networks, for example, when UE is operating in a Radio-Resource Control (RRC) connected mode or a RRC Idle mode, e.g., as described below.

In some demonstrative embodiments, node 104 may be configured to control network selection and/or traffic steering of UE 102 between WLAN networks, e.g., WLAN 107, and cellular networks, e.g., cell 103, e.g., as described below.

In one example, node 104 may be configured to control network selection and/or traffic steering of UE 102 between the WLAN networks and the cellular networks through direct network initiated triggers, e.g., as described below.

In another example, node 104 may be configured to control network selection and/or traffic steering of UE 102 between the WLAN networks and the cellular networks through assignment messaging, e.g., as described below.

In another example, node 104 may be configured to control network selection and/or traffic steering of UE 102 between the WLAN networks and the cellular networks by using network assistance to assist, steer and/or control UE network selection, e.g., as described below.

Some demonstrative embodiments may be implemented, for example, without requiring any changes for WLAN interfaces, e.g., even if UE 102 is unable to provide cellular network statistics, e.g., of cell 103, to WLAN APs, e.g., to AP 106.

In some demonstrative embodiments, UE 102 may transmit to node 104 measurement information corresponding to WLAN 107, e.g., as described below.

In some demonstrative embodiments, node 104 may configure the measurements performed by UE 102, for example, using one or more configuration messages, which may be transmitted from node 104 to UE 102 via the cellular link between UE 102 and node 104, e.g., as described below.

For example, node 104 may transmit to UE 102 at least one configuration message to configure one or more measurements to be performed by UE 102 with respect to WLAN 107, e.g., as described below.

In some demonstrative embodiments, node 104 may request from UE 102 information relating to one or more serving WLANs and/or neighboring WLANs, e.g., including WLAN 107, for example, a Neighboring WLAN identifiers report, a Neighboring WLAN signal strength/rate report, a Neighboring WLAN signal strength/rate report, e.g., based on a BSS_Load_Info, "Serving" WLAN Load information, e.g., based on a BSS_Load_Info broadcast by AP 106, a "Serving" WLAN network overload indication, a UE current WLAN QoS indicator, e.g., per Quality of Service (QoS) Class Indicator (QCI) identifiers, a UE WLAN preference indicator, other "Detected WLAN" cells for which explicit measurements were not solicited, and/or any other information, e.g., as described below.

In some demonstrative embodiments, UE 102 may transmit to node 104 a report message including the measurement information corresponding to WLAN 107, e.g., as described below.

In some demonstrative embodiments, UE may transmit the report message to node 104, when UE 102 is at the RRC Connected state, e.g., as described below.

In some demonstrative embodiments, it may be easier for UE 102 to report the measurement information to node 104, for example, when UE 102 is in the RRC connected state.

In some demonstrative embodiments, node 104 may configure the measurements and/or the report messages by UE 102, for example, via RRC signaling messages. In one example, a RRCConnectionReconfiguration message and/or measConfig information elements may be used for setting WLAN specific measurements and associated triggers for reporting the measurements, e.g., as described below. UE 102 may, for example, respond by sending a MeasurementReport via a RRCConnectionReconfigurationComplete message. Other messages, e.g., RRCConnectionReestablishment and/or RRCConnectionRestablishmentComplete, may be used for this procedure.

In some demonstrative embodiments, UE 102 may transmit the report message to node 104, when UE 102 is at the RRC Idle state, e.g., as described below.

In some demonstrative embodiments, node 104 may configure WLAN measurements for UE 102, e.g., with respect to WLAN 107.

In some demonstrative embodiments, node 104 may transmit to UE 102 the configuration message including one or more parameters corresponding to at least one WLAN, for which measurements are requested.

In some demonstrative embodiments, the configuration message may include a Measurement Information Element (IE) including the at least one parameter, e.g., as described below.

In one example, the configuration message may include at least one identifier of the WLAN, at least one frequency band of the WLAN, at least one frequency channel of the WLAN, and/or any other parameter, e.g., as described below.

In some demonstrative embodiments, the identifier of the WLAN may include, for example, a Service Set Identification (SSID), an Extended SSID (ESSID), a Basic SSID (SSID), a Roaming Consortium, a Hotspot Operator Friendly Name, a Network Access Identifier (NAI) Home Realm, a Mobility Domain, and/or any additional or alternative identifier of the WLAN, e.g., as described below.

In some demonstrative embodiments, node 104 may use RRC signaling to configure the WLAN measurements for UE 102.

In some demonstrative embodiments, node 104 may configure the WLAN measurements using a RRCConnectionReconfiguration message, e.g., as described below. In other embodiments any other message and/or information element may be used.

In some demonstrative embodiments, node 104 may transmit to UE 102 a RRCConnectionReconfiguration message identifying one or more inter-RAT measurements of WLAN frequencies.

In some demonstrative embodiments, node 104 may use the RRCConnectionReconfiguration message to request UE 102 to measure, e.g., using a WLAN baseband of radio 143, and to report information corresponding to one or more WLANs, e.g., WLAN 107, which may be, for example, suitable candidates for UE mobility to WLAN, e.g., of UE 102 and/or one or more other UEs within cell 103.

In some demonstrative embodiments, the RRCConnectionReconfiguration may include an IE, e.g., an optional "MeasConfig" IE, which may include a list of measurement objects. The MeasConfig IE may include for example, a measObjectToAddModList IE, e.g., as follows:

```
-- ASN1START
MeasConfig ::=                    SEQUENCE {
    -- Measurement objects
    measObjectToRemoveList        MeasObjectToRemoveList        OPTIONAL,    -- Need ON
    measObjectToAddModList        MeasObjectToAddModList        OPTIONAL,    -- Need ON
    -- Reporting configurations
    reportConfigToRemoveList      ReportConfigToRemoveList      OPTIONAL,    -- Need ON
    reportConfigToAddModList      ReportConfigToAddModList      OPTIONAL,    -- Need ON
    -- Measurement identities
    measIdToRemoveList            MeasIdToRemoveList            OPTIONAL,    -- Need ON
    measIdToAddModList            MeasIdToAddModList            OPTIONAL,    -- Need ON
    -- Other parameters
    quantityConfig                QuantityConfig                OPTIONAL,    -- Need ON
    measGapConfig                 MeasGapConfig                 OPTIONAL,    -- Need ON
    s-Measure                     RSRP-Range                    OPTIONAL,    -- Need ON
    preRegistrationInfoHRPD       PreRegistrationInfoHRPD       OPTIONAL,    -- Need OP
    speedStatePars        CHOICE {
        release                       NULL,
        setup                         SEQUENCE {
            mobilityStateParameters       MobilityStateParameters,
            timeToTrigger-SF              SpeedStateScaleFactors
        }
    }                                                           OPTIONAL,    -- Need ON
    ...
}
MeasIdToRemoveList ::=            SEQUENCE (SIZE (1..maxMeasId)) OF MeasId
MeasObjectToRemoveList ::=        SEQUENCE (SIZE (1..maxObjectId)) OF MeasObjectId
ReportConfigToRemoveList ::=      SEQUENCE (SIZE (1..maxReportConfigId)) OF ReportConfigId
-- ASN1STOP
```

In some demonstrative embodiments, the measObjectToAddModList IE may include, for example, measurement objects corresponding to one or more, e.g., different RATs.

In some demonstrative embodiments, the measObjectToAddModList IE may include, for example, a WLAN measurement object, denoted measObjectWLAN, e.g., as follows:

```
-- ASN1START
MeasObjectToAddModList ::=    SEQUENCE (SIZE (1..maxObjectId)) OF MeasObjectToAddMod
MeasObjectToAddMod ::=    SEQUENCE {
    measObjectId            MeasObjectId,
    measObject              CHOICE {
        measObjectEUTRA         MeasObjectEUTRA,
        measObjectUTRA          MeasObjectUTRA,
        measObjectGERAN         MeasObjectGERAN,
        measObjectCDMA2000      MeasObjectCDMA2000,
        measObjectWLAN          MeasObjectWLAN,
        ...
    }
}
-- ASN1STOP
```

In some demonstrative embodiments, node 104 may use the measObjectWLAN IE to request UE 102 to perform one or more WLAN related measurements, e.g., as described below.

In some demonstrative embodiments, the MeasObjectW-LAN IE may include one or more parameters corresponding to one or more WLANs, for which UE 102 is to perform measurements. For example, the MeasObjectWLAN IE may include a SSID list; an ESSID list; a BSSID list; a frequency band, e.g., 2.4 GHz or 5 GHz and the like; a Channel and/or frequency list; one or more parameters defined in any suitable WLAN Specifications and/or Protocols, e.g., a Roaming Consortium, a Hotspot Operator Friendly Name, a NAI Home Realm, a Mobility Domain, and/or any other parameter.

In one example, the MeasObjectWLAN IE may include, for example, the following information:

Received Signal to Noise Indicator (RSNI) threshold, a WLAN channel utilization, and/or any other additional or alternative parameter to trigger UE 102 to report the WLAN measurement information, e.g., as described below.

In some demonstrative embodiments, node 104 may transmit the reporting configuration information as part of an IE, e.g., a ReportConfigInterRAT IE, which may specify criteria for triggering of an inter-RAT measurement reporting event. For example, an inter-RAT measurement reporting event may be labeled by a label, denoted BN, N=1, 2, . . . n, wherein n denotes a number of the inter-RAT measurement reporting events.

In one example, an event B1 may be defined to trigger a report when a parameter of a WLAN Neighbor, e.g., WLAN

```
-- ASN1START
MeasObjectWLAN ::=    SEQUENCE {
    channel             WLANChannel         OPTIONAL,
    ssidsToRemoveList   CellIndexList       OPTIONAL,
    ssidsToAddModList   SSIDsToAddModList   OPTIONAL,
}
SSIDsToAddModList ::=   SEQUENCE (SIZE (1..maxCellMeas)) OF SSIDsToAddMod
SSIDsToAddMod ::=   SEQUENCE {
    cellIndex       INTEGER (1..maxCellMeas),
    ssid            SSID,
    bssid           BSSID                   OPTIONAL,
}
SSID    ::=     OCTET STRING (SIZE (32))
BSSID   ::=     BIT STRING (SIZE (48))
-- ASN1STOP
```

In some demonstrative embodiments, node 104 may transmit to UE 102 the configuration message including reporting configuration information defining a reporting criterion defining a criterion to trigger UE 102 to send the report message, and/or a reporting format defining the measurement information to be reported by UE 102, e.g., as described below.

In some demonstrative embodiments, the reporting criterion may define a periodical reporting event, e.g., to trigger UE 102 to report the WLAN measurement information periodically.

In other demonstrative embodiments, the reporting criterion may define a single reporting event, e.g., to trigger a single report of the WLAN measurement information.

In some demonstrative embodiments, the reporting criterion may include a criterion related to WLAN network availability, a Received Signal Strength Indicator (RSSI) threshold, a Received Channel Power Indicator (RCPI) threshold, a Received Power Indicator (RPI) threshold, a 107, becomes better than an absolute threshold, denoted Threshold; and/or an event B2 may be defined to trigger a report when a parameter of a LTE cell, e.g., cell 103, becomes worse than a first absolute threshold, denoted Threshold1, and a parameter of a WLAN neighbor, e.g., WLAN 107, becomes better than a second absolute threshold, denoted Threshold2. The b1 and b2 event thresholds may be expressed, for example, as an unsigned binary number equal to [$-2 \times 10 \log 10\ E_c/I_o$] in units of 0.5 dB, or in any other form. For example, a field bN-ThresholdM may define a threshold to be used in inter-RAT measurement report triggering condition for event number bN. If multiple thresholds are defined for event number bN, the thresholds may be differentiated by M.

For example, the reporting configuration information may define Threshold value to configure UE 102 to report WLAN measurements to node 104, for example, when a signal strength of AP 106 is high enough, e.g., higher than the Threshold value. UE 102 may receive the high signal strength from AP 106, for example, when UE 102 is in relatively good WLAN coverage. In another example, the reporting configuration information may trigger UE 102 to report WLAN measurements to node 104, for example, when UE 102 has relatively bad LTE coverage, e.g., when an LTE measurement is lesser than the Threshold1, and while UE 102 has relatively good WLAN coverage, e.g., the WLAN measurement is greater than the Threshold2.

In some demonstrative embodiments, the ReportConfigInterRAT IE may include the following fields:

In one example, one or more fields of the ReportConfigInterRAT IE may be defined, e.g., as follows:

| ReportConfigInterRAT field descriptions |
| --- |
| bN-ThresholdM |
| Threshold to be used in inter RAT measurement report triggering condition for event number bN.<br>If multiple thresholds are defined for event number bN, the thresholds are differentiated by M. |
| eventId |
| Choice of inter-RAT event triggered reporting criteria. |

```
-- ASN1START
ReportConfigInterRAT ::=                     SEQUENCE {
    triggerType                                  CHOICE {
        event                                        SEQUENCE {
            eventId                                      CHOICE {
                eventB1                                      SEQUENCE {
                    b1-Threshold                                 CHOICE {
                        b1-ThresholdUTRA                             ThresholdUTRA,
                        b1-ThresholdGERAN                            ThresholdGERAN,
                        b1-ThresholdCDMA2000                         ThresholdCDMA2000,
                        b1-ThresholdWLAN                             ThresholdWLAN
                    }
                },
                eventB2                                      SEQUENCE {
                    b2-Threshold1                                ThresholdEUTRA,
                    b2-Threshold2                                CHOICE {
                        b2-Threshold2UTRA                            ThresholdUTRA,
                        b2-Threshold2GERAN                           ThresholdGERAN,
                        b2-Threshold2CDMA2000                        ThresholdCDMA2000,
                        b1-ThresholdWLAN                             ThresholdWLAN
                    }
                },
                ...
            },
            hysteresis                                   Hysteresis,
            timeToTrigger                                TimeToTrigger
        },
        periodical                                   SEQUENCE {
            purpose                                      ENUMERATED {
                                                             reportStrongestCells,
                                                             reportStrongestCellsForSON,
                                                             reportCGI}
        }
    },
    maxReportCells                               INTEGER (1..maxCellReport),
    reportInterval                               ReportInterval,
    reportAmount                                 ENUMERATED {r1, r2, r4, r8, r16, r32, r64, infinity},
    ...,
    [[   si-RequestForHO-r9                      ENUMERATED {setup}   OPTIONAL   -- Cond reportCGI
    ]],
    [[   reportQuantityUTRA-FDD-r10              ENUMERATED {both}    OPTIONAL   -- Need OR
    ]],
    [[   includeLocationInfo-r11                 ENUMERATED {true}    OPTIONAL   -- Need OR
    ]]
}
ThresholdUTRA ::=                            CHOICE{
    utra-RSCP                                    INTEGER (-5..91),
    utra-EcN0                                    INTEGER (0..49)
}
ThresholdGERAN ::=                           INTEGER (0..63)
ThresholdCDMA2000 ::=                        INTEGER (0..63)
ThresholdWLAN ::=                            CHOICE{
    wlan-rssi                                    INTEGER (0..255),
    wlan-rcpi                                    INTTEGER (0..255),
    wlan-rsni                                    INTTEGER (0..255),
    wlan-channel-utilization                     INTTEGER (0..255)
}
-- ASN1STOP
```

| ReportConfigInterRAT field descriptions |
| --- |
| maxReportCells |
| Max number of cells, excluding the serving cell, to include in the measurement report. In case purpose is set to reportStrongestCellsForSON only value 1 applies. |
| Purpose |
| reportStrongestCellsForSON applies only in case reportConfig is linked to a measObject set to measObjectUTRA or measObjectCDMA2000. |
| reportAmount |
| Number of measurement reports applicable for triggerType event as well as for triggerType periodical. In case purpose is set to reportCGI or reportStrongestCellsForSON only value 1 applies. |
| reportQuantityUTRA-FDD |
| The quantities to be included in the UTRA measurement report. The value both means that both the cpich RSCP and cpich EcN0 quantities are to be included in the measurement report. |
| si-RequestForHO |
| The field applies to the reportCGI functionality, and when the field is included, the UE is allowed to use autonomous gaps in acquiring system information from the neighbour cell, applies a different value for T321, and includes different fields in the measurement report. |
| ThresholdGERAN |
| The actual value is IE value − 110 dBm. |
| ThresholdUTRA |
| utra-RSCP corresponds to CPICH_RSCP in TS 25.133 [29] for FDD and P-CCPCH_RSCP in TS 25.123 [30] for TDD. utra-EcN0 corresponds to CPICH_Ec/No in TS 25.133 [29] for FDD, and is not applicable for TDD.<br>For utra-RSCP: The actual value is IE value − 115 dBm.<br>For utra-EcN0: The actual value is (IE value − 49)/2 dB. |
| ThresholdWLAN |
| wlan-rssi corresponds to receive signal strength indicator in 802.11-2012<br>wlan-rcpi corresponds to received channel power indicator in 802.11-2012<br>wlan-rsni corresponds to received signal to noise indicator in 802.11-2012<br>wlan-channel-utilization corresponds to channel utilization in 802.11-2012 |
| timeToTrigger |
| Time during which specific criteria for the event needs to be met in order to trigger a measurement report. |

In some demonstrative embodiments, node 104 may use an IE to define to UE 102 what parameters are to be measured with respect to the one or more WLANs.

In one example, node 104 may use the QuantityConfig IE to specify what WLAN measurements are to be performed by UE 102 and/or what parameters are to be included in the measurement information to be reported by UE 102.

For example, the QuantityConfig IE may specify measurement quantities and/or filtering coefficients, e.g., layer 3 filtering coefficients of inter-RAT measurements, e.g., as follows:

| QuantityConfig information element |
| --- |
| ```
-- ASN1START
QuantityConfig ::=              SEQUENCE {
    quantityConfigEUTRA             QuantityConfigEUTRA         OPTIONAL,   -- Need ON
    quantityConfigUTRA              QuantityConfigUTRA          OPTIONAL,   -- Need ON
    quantityConfigGERAN             QuantityConfigGERAN         OPTIONAL,   -- Need ON
    quantityConfigCDMA2000          QuantityConfigCDMA2000      OPTIONAL,   -- Need ON
    ...,
    [[  quantityConfigUTRA-v1020    QuantityConfigUTRA-v1020    OPTIONAL    -- Need ON
    ]]
    [[  quantityConfigWLAN          QuantityConfigWLAN          OPTIONAL    -- Need ON
    ]]
}
QuantityConfigEUTRA ::=         SEQUENCE {
    filterCoefficientRSRP           FilterCoefficient           DEFAULT fc4,
    filterCoefficientRSRQ           FilterCoefficient           DEFAULT fc4
}
QuantityConfigUTRA ::=          SEQUENCE {
    measQuantityUTRA-FDD            ENUMERATED {cpich-RSCP, cpich-EcN0},
    measQuantityUTRA-TDD            ENUMERATED {pccpch-RSCP},
    filterCoefficient               FilterCoefficient           DEFAULT fc4
}
QuantityConfigUTRA-v1020 ::=    SEQUENCE {
    filterCoefficient2-FDD-r10      FilterCoefficient           DEFAULT fc4
}
QuantityConfigGERAN ::=         SEQUENCE {
    measQuantityGERAN               ENUMERATED {rssi},
    filterCoefficient               FilterCoefficient           DEFAULT fc2
}
QuantityConfigCDMA2000 ::=      SEQUENCE {
    measQuantityCDMA2000            ENUMERATED {pilotStrength, pilotPnPhaseAndPilotStrength}
}
QuantityConfigWLAN ::=          SEQUENCE {
    measQuantityWLAN                ENUMERATED {rssi, rsni, rcpi, channel-utilization },
    filterCoefficient               FilterCoefficient           DEFAULT fc4
}
-- ASN1STOP
``` |

In one example, one or more fields of the QuantityConfig IE may be defined, e.g., as follows:

| QuantityConfig field descriptions |
|---|
| filterCoefficient2-FDD |
| Specifies the filtering coefficient used for the UTRAN FDD measurement quantity, which is not included in measQuantityUTRA-FDD, when reportQuantityUTRA-FDD is present in ReportConfigInterRAT. |
| filterCoefficientRSRP |
| Specifies the filtering coefficient used for RSRP. |
| filterCoefficientRSRQ |
| Specifies the filtering coefficient used for RSRQ. |
| measQuantityCDMA2000 |
| Measurement quantity used for CDMA2000 measurements. pilotPnPhaseAndPilotStrength is only applicable for MeasObjectCDMA2000 of cdma2000-Type = type1XRTT. |
| MeasQuantityGERAN |
| Measurement quantity used for GERAN measurements. |
| measQuantityUTRA |
| Measurement quantity used for UTRA measurements. |
| quantityConfigCDMA2000 |
| Specifies quantity configurations for CDMA2000 measurements. |
| QuantityConfigEUTRA |
| Specifies filter configurations for E-UTRA measurements. |
| QuantityConfigGERAN |
| Specifies quantity and filter configurations for GERAN measurements. |
| quantityConfigUTRA |
| Specifies quantity and filter configurations for UTRA measurements. Field quantityConfigUTRA-v1020 is applicable only when reportQuantityUTRA-FDD is configured. |
| quantityConfigWLAN |
| Specifies quantity and filter configurations for WLAN measurements. |

In some demonstrative embodiments, UE 102 may transmit to node 104 at least one report message including the measurement information corresponding to WLAN 107 and/or one or more other WLANs.

In some demonstrative embodiments, UE 102 may transmit the report message based on the measurement reporting configuration information defined by node 104.

In some demonstrative embodiments, UE 102 may transmit the report message to node 104 according to a measurement reporting procedure, for example, as part of a MeasurementReport RRC message, e.g., as described below, or any other message.

In some demonstrative embodiments, MeasurementReport RRC message may include an IE, e.g., a measResults IE, which may carry measurement results for neighboring cells, which belong to different RATs. According to these embodiments, the measResults IE may include the WLAN measurement results.

In some demonstrative embodiments, the WLAN measurement results may include one or more types of information, e.g., including one or more of the following parameters and/or any other information:

1. SSID or ESSID;
2. BSSID;
3. Other WLAN identifiers, e.g., one or more identifiers as defined in the HotSpot 2.0 specification, e.g. Roaming Consortium, Hotspot Operator Friendly Name, NAI Home Realm, Mobility Domain, and/or any other WLAN identifiers;
4. Channel/frequency;
5. Privacy and security;
6. Receive signal strength indicator (RSSI), e.g., as defined by *IEEE* 802.11-2012;
7. Received channel power indicator (RCPI), e.g., as defined by *IEEE* 802.11-2012;
8. Received power indicator (RPI), e.g., as defined by *IEEE* 802.11-2012;
9. Received signal to noise indicator (RSNI), e.g., as defined by *IEEE* 802.11-2012;
10. Channel traffic, e.g., as defined by *IEEE* 802.11-2012;
11. Channel load, e.g., as defined by *IEEE* 802.11-2012;
12. Noise histogram, e.g., as defined by *IEEE* 802.11-20121;
13. STA statistics, e.g., as defined by *IEEE* 802.11-2012;
14. Location, e.g., as defined by *IEEE* 802.11-2012;
15. Neighbor report, e.g., as defined by *IEEE* 802.11-2012;
16. Link measurement, e.g., as defined by *IEEE* 802.11-2012;
17. BSS Load, e.g., as defined by *IEEE* 802.11-2012;
18. AP Channel Report, e.g., as defined by *IEEE* 802.11-2012;
19. BSS Available Admission Capacity, e.g., as defined by *IEEE* 802.11-2012;
20. BSS AC Access Delay, e.g., as defined by *IEEE* 802.11-2012;
21. Supported rates, e.g., as defined by *IEEE* 802.11-2012;
22. Extended Supported Rates, e.g., as defined by *IEEE* 802.11-2012; and/or
23. Power Constraint, e.g., as defined by *IEEE* 802.11-2012.

In some demonstrative embodiments, the measurement report IE may include, for example, the following information:

```
-- ASN1START
MeasResults ::=                 SEQUENCE {
    measId                          MeasId,
    measResultPCell                 SEQUENCE {
        rsrpResult                      RSRP-Range,
        rsrqResult                      RSRQ-Range
    },
    measResultNeighCells            CHOICE {
        measResultListEUTRA             MeasResultListEUTRA,
        measResultListUTRA              MeasResultListUTRA,
        measResultListGERAN             MeasResultListGERAN,
```

```
            measResultsCDMA2000         MeasResultsCDMA2000,
            measResultsListWLAN         MeasResultsListWLAN,
            ...
        }                                                                   OPTIONAL,
        ...,
        [[  measResultForECID-r9        MeasResultForECID-r9                OPTIONAL
        ]],
        [[  locationInfo-r10            LocationInfo-r10                    OPTIONAL,
            measResultServFreqList-r10  MeasResultServFreqList-r10          OPTIONAL
        ]]
    }
MeasResultListWLAN ::=      SEQUENCE (SIZE (1..maxCellReport)) OF MeasResultWLAN
MeasResultWLAN ::=  SEQUENCE {
    ssid                    SSID,
    bssid                   BSSID                       OPTIONAL,
    channel                 WLANChannel                 OPTIONAL,
    bssLoad                 BSSLoad                     OPTIONAL,
    channelLoad             ChannelLoad                 OPTIONAL,
    measResult              SEQUENCE {
        rcpi                RCPI                        OPTIONAL,
        rsni                RSNI                        OPTIONAL,
        ...
    }
}
MeasResultListEUTRA ::=     SEQUENCE (SIZE (1..maxCellReport)) OF MeasResultEUTRA
MeasResultEUTRA ::=     SEQUENCE {
    physCellId              PhysCellId,
    cgi-Info                SEQUENCE {
        cellGlobalId            CellGlobalIdEUTRA,
        trackingAreaCode        TrackingAreaCode,
        plmn-IdentityList       PLMN-IdentityList2              OPTIONAL
    }                                                           OPTIONAL,
    measResult              SEQUENCE {
        rsrpResult              RSRP-Range                      OPTIONAL,
        rsrqResult              RSRQ-Range                      OPTIONAL,
        ...,
        [[  additionalSI-Info-r9    AdditionalSI-Info-r9        OPTIONAL
        ]]
    }
}
MeasResultServFreqList-r10 ::=  SEQUENCE (SIZE (1..maxServCell-r10)) OF MeasResultServFreq-r10
MeasResultServFreq-r10 ::=      SEQUENCE {
    servFreqId-r10          ServCellIndex-r10,
    measResultSCell-r10         SEQUENCE {
        rsrpResultSCell-r10         RSRP-Range,
        rsrqResultSCell-r10         RSRQ-Range
    }                                                           OPTIONAL,
    measResultBestNeighCell-r10 SEQUENCE {
        physCellId-r10              PhysCellId,
        rsrpResultNCell-r10         RSRP-Range,
        rsrqResultNCell-r10         RSRQ-Range
    }                                                           OPTIONAL,
    ...
}
MeasResultListUTRA ::=      SEQUENCE (SIZE (1..maxCellReport)) OF MeasResultUTRA
MeasResultUTRA ::=  SEQUENCE {
    physCellId              CHOICE {
        fdd                     PhysCellIdUTRA-FDD,
        tdd                     PhysCellIdUTRA-TDD
    },
    cgi-Info                SEQUENCE {
        cellGlobalId            CellGlobalIdUTRA,
        locationAreaCode        BIT STRING (SIZE (16))          OPTIONAL,
        routingAreaCode         BIT STRING (SIZE (8))           OPTIONAL,
        plmn-IdentityList       PLMN-IdentityList2              OPTIONAL
    }                                                           OPTIONAL,
    measResult              SEQUENCE {
        utra-RSCP               INTEGER (-5..91)                OPTIONAL,
        utra-EcN0               INTEGER (0..49)                 OPTIONAL,
        ...,
        [[  additionalSI-Info-r9    AdditionalSI-Info-r9        OPTIONAL
        ]]
    }
}
MeasResultListGERAN ::=     SEQUENCE (SIZE (1..maxCellReport)) OF MeasResultGERAN
MeasResultGERAN ::=     SEQUENCE {
    carrierFreq             CarrierFreqGERAN,
    physCellId              PhysCellIdGERAN,
    cgi-Info                SEQUENCE {
```

```
        cellGlobalId              CellGlobalIdGERAN,
        routingAreaCode               BIT STRING (SIZE (8))           OPTIONAL
    }                                                                 OPTIONAL,
    measResult                    SEQUENCE {
        rssi                          INTEGER (0..63),
        ...
    }
}
MeasResultsCDMA2000 ::=           SEQUENCE {
    preRegistrationStatusHRPD         BOOLEAN,
    measResultListCDMA2000            MeasResultListCDMA2000
}
MeasResultListCDMA2000 ::=        SEQUENCE (SIZE (1..maxCellReport)) OF MeasResultCDMA2000
MeasResultCDMA2000 ::=    SEQUENCE {
    physCellId                        PhysCellIdCDMA2000,
    cgi-Info                          CellGlobalIdCDMA2000            OPTIONAL,
    measResult                        SEQUENCE {
        pilotPnPhase                      INTEGER   (0..32767)        OPTIONAL,
        pilotStrength                     INTEGER (0..63),
        ...
    }
}
MeasResultForECID-r9 ::=          SEQUENCE {
    ue-RxTxTimeDiffResult-r9          INTEGER (0..4095),
    currentSFN-r9                     BIT STRING (SIZE (10))
}
PLMN-IdentityList2 ::=            SEQUENCE (SIZE (1..5)) OF PLMN-Identity
AdditionalSI-Info-r9 ::=          SEQUENCE {
    csg-MemberStatus-r9               ENUMERATED {member}             OPTIONAL,
    csg-Identity-r9                   CSG-Identity                    OPTIONAL
}
-- ASN1STOP
```

In some demonstrative embodiments, the measurement information received from UE 102 may be used by the cellular network, e.g., by node 104 and/or any other element of the cellular network, with respect to assisting making and/or controlling WLAN mobility decisions, fully network controlled mobility and/or UE controlled mobility with network assistance, as described below.

In some demonstrative embodiments, node 104 may trigger a UE, e.g., UE 102 and/or another UE, to start or stop offloading to WLAN 107, for example, based on the measurement information corresponding to WLAN 107 and/or based on any other information, e.g., as described below.

In some demonstrative embodiments, UE 102 may receive from node 104 at least one trigger message, e.g., via the cellular link between UE 102 and node 104, and controller 145 may control access network selection of UE 102 based on the trigger message, e.g., as described below.

In some demonstrative embodiments, node 104 may receive one or more measurement reports from UE 102 and/or one or more other UEs, and, based on the measurement reports, node 104 may request a UE, e.g., UE 102, to move one or more bearers to or from a WLAN, e.g., WLAN 107, and/or node 104 may direct the UE to move one or more selected flows, e.g., identified through QCI description or in any other manner, to a cellular network, e.g., cell 103. Alternatively, node 104 may request UE 102 to move all traffic to or from the WLAN.

In one example, a node, e.g., node 104, may schedule WLAN measurements for one or more WLAN capable UEs, e.g., UE 102, connected to the node. A UE may perform WLAN measurements, e.g., based on a configuration defined by the node, and the UE may report results of the measurements to the node. The node may trigger the UE to start (or stop) offload to a WLAN. The UE may decide to trigger the offload based, for example, on WLAN and/or cellular network load, WLAN and/or cellular radio conditions, and/or one or more other parameters, e.g., as described below.

In some demonstrative embodiments, node 104 may use RRC signaling to request, assist, control and/or cause UE 102 to switch between the cellular and non-cellular networks.

In some demonstrative embodiments, node 104 may trigger the access network selection by UE 102 by transmitting a trigger message to UE 102.

In some demonstrative embodiments, node 104 may transmit the trigger message directly to UE 102, e.g., using a dedicated RRC signaling message, as described below.

For example, node 104 may trigger UE 102 to start or stop WLAN offload, for example, by transmitting to UE 102 a dedicated DLInformationTransfer RRC message, a dedicated RRCConnectionReconfiguration RRC message, e.g., with a MobilityControlInfo information element, a dedicated HandoverFromEUTRAPreparationRequest RRC message, a dedicated MobilityFromEUTRACommand RRC message, a dedicated RRCConnectionRelease RRC message, a dedicated RRCConnectionReject message, and/or any other RRC message.

In some demonstrative embodiments, node 104 may utilize a priority based cell reselection mechanism configured to support WLAN, e.g., in addition to cellular networks.

In some demonstrative embodiments, the trigger message may include a reselection frequency list including a plurality of WLAN frequencies, including a WLAN frequency of WLAN 107, associated with a plurality of cell reselection priorities, including a reselection priority of WLAN 107, e.g., as described below.

In some demonstrative embodiments, a System Information Block (SIB), for example, SIB type 3, 5, 6, 7, 8 or a new SIB, may be configured to include frequency and/or priority information to support the priority based cell reselection mechanism for the WLAN. For example, node 104 may broadcast the SIB including the reselection frequency list.

In some demonstrative embodiments, a RRCConnectionRelease message may be configured to include inter-RAT frequency and priority information for cell reselection, including WLAN network, frequency and priority information.

In some demonstrative embodiments, node 104 may provide to UE 102 the reselection frequency list, e.g., as part of system information, which may be included in the RRCConnectionRelease message.

In some demonstrative embodiments, UE 102 may select a frequency with highest priority that satisfies a cell selection criteria, e.g., when UE 102 is at idle mode.

In one example, UE 102 may consider selecting to switch from a current RAT cell, e.g., cell 103, to WLAN 107, for example, if the WLAN priority defined for WLAN 107 is greater than a priority of the current RAT, for example, according to the cell reselection criteria, e.g., when UE 102 determines a quality of the current cell is not good enough for UE 102.

In one example, the RRCConnectionRelease message may include the frequency reselection list, e.g., as follows:

```
-- ASN1START
RRCConnectionRelease ::=             SEQUENCE {
    rrc-TransactionIdentifier        RRC-TransactionIdentifier,
    criticalExtensions               CHOICE {
        c1                               CHOICE {
            rrcConnectionRelease-r8          RRCConnectionRelease-r8-IEs,
            spare3 NULL, spare2 NULL, spare1 NULL
        },
        criticalExtensionsFuture         SEQUENCE { }
    }
}
RRCConnectionRelease-r8-IEs ::=      SEQUENCE {
    releaseCause                         ReleaseCause,
    redirectedCarrierInfo                RedirectedCarrierInfo           OPTIONAL,   -- Need ON
    idleModeMobilityControlInfo          IdleModeMobilityControlInfo         OPTIONAL,   -- Need OP
    nonCriticalExtension                 RRCConnectionRelease-v890-IEs       OPTIONAL    -- Need OP
}
RRCConnectionRelease-v890-IEs ::=    SEQUENCE {
    lateNonCriticalExtension             OCTET STRING (CONTAINING RRCConnectionRelease-v9e0-IEs)
OPTIONAL,   -- Need OP
    nonCriticalExtension                 RRCConnectionRelease-v920-IEs       OPTIONAL    -- Need OP
}
-- Late non critical extensions
RRCConnectionRelease-v9e0-IEs ::= SEQUENCE {
    redirectedCarrierInfo-v9e0           RedirectedCarrierInfo-v9e0          OPTIONAL,   -- Cond
NoRedirect-r8
    idleModeMobilityControlInfo-v9e0     IdleModeMobilityControlInfo-v9e0 OPTIONAL,   -- Cond IdleInfoEUTRA
    nonCriticalExtension                 SEQUENCE { }                        OPTIONAL    -- Need OP
}
-- Regular non critical extensions
RRCConnectionRelease-v920-IEs ::=    SEQUENCE {
    cellInfoList-r9                      CHOICE {
        geran-r9                             CellInfoListGERAN-r9,
        utra-FDD-r9                              CellInfoListUTRA-FDD-r9,
        utra-TDD-r9                              CellInfoListUTRA-TDD-r9,
        ...,
        utra-TDD-r10                         CellInfoListUTRA-TDD-r10
    }                                                                        OPTIONAL,   -- Cond Redirection
    nonCriticalExtension                 RRCConnectionRelease-v1020-IEs      OPTIONAL    -- Need OP
}
RRCConnectionRelease-v1020-IEs ::=   SEQUENCE {
    extendedWaitTime-r10                 INTEGER (1..1800)   OPTIONAL,   -- Need ON
    nonCriticalExtension                 RRCConnectionRelease-v1200-IEs          OPTIONAL    -- Need OP
}
RRCConnectionRelease-v1200-IEs ::= SEQUENCE {
    idleModeMobilityControlInfo-v1200            IdleModeMobilityControlInfo-v1200
OPTIONAL, -- Need OP
    nonCriticalExtension                 SEQUENCE { }            OPTIONAL    -- Need OP
}
IdleModeMobilityControlInfo-v1200 ::=        SEQUENCE {
    channelPriorityListWLAN              ChannelPriorityListWLAN         OPTIONAL,           -- Need ON
}
ChannelPriorityListWLAN ::=          SEQUENCE (SIZE (1..maxWLAN-Channel)) OF ChannelPriorityWLAN
ChannelPriorityWLAN ::=              SEQUENCE {
    channel                              WLANChannel,
    cellReselectionPriority              CellReselectionPriority
}
ReleaseCause ::=                     ENUMERATED {loadBalancingTAUrequired,
                                                 other, cs-FallbackHighPriority-v1020, spare1}

RedirectedCarrierInfo ::=            CHOICE {
    eutra                                ARFCN-ValueEUTRA,
    geran                                    CarrierFreqsGERAN,
    utra-FDD                             ARFCN-ValueUTRA,
    utra-TDD                             ARFCN-ValueUTRA,
```

```
        cdma2000-HRPD                      CarrierFreqCDMA2000,
        cdma2000-1xRTT                     CarrierFreqCDMA2000,
        ...,
        utra-TDD-r10                       CarrierFreqListUTRA-TDD-r10
}
RedirectedCarrierInfo-v9e0 ::=     SEQUENCE {
    eutra-v9e0                         ARFCN-ValueEUTRA-v9e0
}
CarrierFreqListUTRA-TDD-r10 ::=    SEQUENCE (SIZE (1..maxFreqUTRA-TDD-r10)) OF ARFCN-
ValueUTRA
IdleModeMobilityControlInfo ::=    SEQUENCE {
    freqPriorityListEUTRA              FreqPriorityListEUTRA         OPTIONAL,    -- Need ON
    freqPriorityListGERAN              FreqsPriorityListGERAN        OPTIONAL,    -- Need ON
    freqPriorityListUTRA-FDD           FreqPriorityListUTRA-FDD      OPTIONAL,    -- Need ON
    freqPriorityListUTRA-TDD           FreqPriorityListUTRA-TDD      OPTIONAL,    -- Need ON
    bandClassPriorityListHRPD          BandClassPriorityListHRPD     OPTIONAL,    -- Need ON
    bandClassPriorityList1XRTT         BandClassPriorityList1XRTT    OPTIONAL,    -- Need ON
    t320                               ENUMERATED {
                                           min5, min10, min20, min30, min60, min120, min180,
                                           spare 1}                  OPTIONAL,    -- Need
OR
    ...
}
IdleModeMobilityControlInfo-v9e0 ::=   SEQUENCE {
    freqPriorityListEUTRA-v9e0             SEQUENCE (SIZE (1..maxFreq)) OF FreqPriorityEUTRA-v9e0
}
FreqPriorityListEUTRA ::=          SEQUENCE (SIZE (1..maxFreq)) OF FreqPriorityEUTRA
FreqPriorityEUTRA ::=              SEQUENCE {
    carrierFreq                        ARFCN-ValueEUTRA,
    cellReselectionPriority            CellReselectionPriority
}
FreqPriorityEUTRA-v9e0 ::=         SEQUENCE {
    carrierFreq-v9e0                   ARFCN-ValueEUTRA-v9e0         OPTIONAL   -- Cond EARFCN-max
}
FreqsPriorityListGERAN ::=         SEQUENCE (SIZE (1..maxGNFG)) OF FreqsPriorityGERAN
FreqsPriorityGERAN ::=             SEQUENCE {
    carrierFreqs                       CarrierFreqsGERAN,
    cellReselectionPriority            CellReselectionPriority
}
FreqPriorityListUTRA-FDD ::=       SEQUENCE (SIZE (1..maxUTRA-FDD-Carrier)) OF FreqPriorityUTRA-FDD
FreqPriorityUTRA-FDD ::=           SEQUENCE {
    carrierFreq                        ARFCN-ValueUTRA,
    cellReselectionPriority            CellReselectionPriority
}
FreqPriorityListUTRA-TDD ::=       SEQUENCE (SIZE (1..maxUTRA-TDD-Carrier)) OF FreqPriorityUTRA-TDD
FreqPriorityUTRA-TDD ::=           SEQUENCE {
    carrierFreq                        ARFCN-ValueUTRA,
    cellReselectionPriority            CellReselectionPriority
}
BandClassPriorityListHRPD ::=      SEQUENCE (SIZE (1..maxCDMA-BandClass)) OF BandClassPriorityHRPD
BandClassPriorityHRPD ::=          SEQUENCE {
    bandClass                          BandclassCDMA2000,
    cellReselectionPriority            CellReselectionPriority
}
BandClassPriorityList1XRTT ::=     SEQUENCE (SIZE (1..maxCDMA-BandClass)) OF BandClassPriority1XRTT
BandClassPriority1XRTT ::=         SEQUENCE {
    bandClass                          BandclassCDMA2000,
    cellReselectionPriority            CellReselectionPriority
}
CellInfoListGERAN-r9 ::=           SEQUENCE (SIZE (1..maxCellInfoGERAN-r9)) OF CellInfoGERAN-r9
CellInfoGERAN-r9 ::=               SEQUENCE {
    physCellId-r9                      PhysCellIdGERAN,
    carrierFreq-r9                     CarrierFreqGERAN,
    systemInformation-r9               SystemInfoListGERAN
}
CellInfoListUTRA-FDD-r9 ::=        SEQUENCE (SIZE (1..maxCellInfoUTRA-r9)) OF CellInfoUTRA-FDD-r9
CellInfoUTRA-FDD-r9 ::=            SEQUENCE {
    physCellId-r9                      PhysCellIdUTRA-FDD,
    utra-BCCH-Container-r9             OCTET STRING
}
CellInfoListUTRA-TDD-r9 ::=        SEQUENCE (SIZE (1..maxCellInfoUTRA-r9)) OF CellInfoUTRA-TDD-r9
CellInfoUTRA-TDD-r9 ::=            SEQUENCE {
    physCellId-r9                      PhysCellIdUTRA-TDD,
    utra-BCCH-Container-r9             OCTET STRING
}
```

-continued

```
CellInfoListUTRA-TDD-r10 ::=      SEQUENCE (SIZE (1..maxCellInfoUTRA-r9)) OF CellInfoUTRA-TDD-r10
CellInfoUTRA-TDD-r10 ::=          SEQUENCE {
    physCellId-r10                    PhysCellIdUTRA-TDD,
    carrierFreq-r10                   ARFCN-ValueUTRA,
    utra-BCCH-Container-r10           OCTET STRING
}
-- ASN1STOP
```

In some demonstrative embodiments, the WLANChannel IE may define the WLAN channel, for example, by including a list of one or more WLAN channels. In one example, the WLANChannel IE may define the WLAN channel using one or more WiFi channel identifiers, for example, wc1 may denote a first WiFi channel frequency, e.g., 2412 MHz, wc11 may denote an eleventh WiFi channel frequency, e.g., 2462 MHz, as follows:

```
-- ASN1START
WLANChannel ::=      ENUMERATED {
                         wc1,
    wc2,
    wc3,
    wc4,
    wc5,
    wc6,
    wc7,
    wc8,
    wc9,
    wc10,
    wc11,
    wc12,
    wc13,
    wc14,
    wc131,
    wc132,
    wc132,
    wc133,
    wc133,
    wc134,
    wc134,
    wc135,
    wc136,
    wc136,
    wc137,
    wc137,
    wc138,
    wc138,
    wc183,
    wc184,
    wc185,
    wc187,
    wc188,
    wc189,
    wc192,
    wc196,
    wc7,
    wc8,
    wc9,
    wc11,
    wc12,
    wc16,
    wc34,
    wc,
    wc36,
    wc38,
    wc40,
    wc42,
    wc44,
    wc46,
    wc48,
    wc52,
    wc56,
    wc60,
    wc64,
    wc100,
    wc104,
    wc108,
    wc112,
    wc116,
    wc120,
    wc124,
    wc128,
    wc132,
    wc136,
    wc140,
    wc149,
    wc153,
    wc157,
    wc161,
    wc165,
    ...}
-- ASN1STOP
```

In some demonstrative embodiments, node 104 may adjust access class barring probabilities according to relative loads of one or more WLAN APs, e.g., AP 106. For example, if the relative load of neighboring WLAN APs is lesser than the load of node 104, then node 104 may increase the access class barring probabilities to ensure that fewer UEs will select node 104 and more UEs will select WLAN AP 106.

In some demonstrative embodiments, the trigger message may include an access barring indication to bar UE 102 from using the cellular link with node 104, for example, in order to cause UE 102 to use a WLAN link, or to bar UE 102 from using the WLAN link with WLAN 107, for example, in order to cause UE 102 to use a cellular link, e.g., as described below.

In one example, controller 145 may be configured to control UE 102, e.g., when UE is at Idle mode, to use WLAN access, e.g., to WLAN 107, instead of cellular access, e.g., to cell 103, for example, when UE 102 is access class barred.

In some demonstrative embodiments, WLAN AP 106 be configured to support access class barring mechanisms similar to the barring mechanisms of the cellular system, e.g., as described above. For example, WLAN AP 106 may be configured to transmit an access barring indication to bar UE 102 from using the WLAN link with AP 106, for example, in order to cause UE 102 to use a cellular link, or to bar UE 102 from using the cellular link with node 104, for example, in order to cause UE 102 to use WLAN link.

In some demonstrative embodiments, node 104 may be able to determine network assistance information corresponding to WLAN 107, for example, based on the measurement information received from UE 102, e.g., as described below.

For example, controller 144 may determine network assistance information corresponding to WLAN 107 and/or one or more other WLANs, e.g., based on the measurement information received from UE 102. According to this example, node 104 may transmit one or more messages, e.g., a broadcast message to be received by one or more UEs and/or a dedicated message addressed to a particular UE, including the network assistance information.

In some demonstrative embodiments, node 104 may transmit a message including the network assistance information.

In some demonstrative embodiments, a node of a serving cell, e.g., node 104, may use the measurement reports received from one or more UEs to assess the quality of various neighboring WLAN links.

In one example, node 104 may broadcast one or more messages, e.g., RRC messages, for example, to be received by one or more UEs within a coverage area of cell 103, e.g., UEs in the RRC Idle state and/or UEs in the RRC Connected state.

In another example, node 104 may transmit a message including the network assistance information directly to a UE within a coverage area of cell 103, e.g., a UE in the RRC Connected state.

In some demonstrative embodiments, the network assistance information may include or may represent a cellular load, a WLAN load, cellular signal strength thresholds used for mobility decisions, e.g. a RSRP threshold, WLAN signal strength thresholds used for mobility decisions, e.g., a RSSI threshold, an offload preference indicator, a WLAN overload indicator, WLAN cell-barring information, a Probability for WLAN network selection, a Probability for WLAN network selection per QCI, and/or any other assistance information to assist access network selection by UE 102.

In some demonstrative embodiments, transmitting selection probabilities as assistance information may be used to allow for a more graceful transition of traffic between RATs, for example, to avoid near simultaneous transition of traffic flows.

Additionally or alternatively to providing the network assistance information corresponding to one or more WLANs, e.g., WLAN 107, in some demonstrative embodiments node 104 may transmit, e.g., broadcast, cellular assistance information relevant to one or more cellular networks, e.g., cell 103. The cellular assistance information may, for example, allow a UE, e.g., UE 102, to make network selection decisions, which may be based on network load considerations, e.g., in addition to or instead of based on signal strength measurements.

In some demonstrative embodiments, the cellular assistance information may include information that may be used instead of the load information. For example, when cell 103 may be overloaded, node 104 may use an access class barring mechanism to control the number of UEs associating with cell 103, e.g., as described above.

In some demonstrative embodiments, node 104 may choose to offload weak users to WLAN links, e.g., provided the WLAN link can support the minimum QoS.

In some demonstrative embodiments, node 104 may control access to cell 103, for example, using SNR/SINR thresholds that identify candidate "weak UEs" for offloading to WLAN, e.g., as described below.

In some demonstrative embodiments, node 104 may use some measurement reports directly for generating network assistance information. For example, node 104 may use WLAN overload indicators reported by the UEs to notify other UEs that a particular WLAN AP, e.g., AP 106, is overloaded.

In some demonstrative embodiments, node 104 may aggregate BSS_Load_Info reports from multiple UEs to determine relative loads across neighboring WLAN APs and/or at node 104.

In some demonstrative embodiments, node 104 may generate and broadcast probabilities of WLAN and cellular network selection, e.g., based on the relative loads. UE 102 may use the probabilities to make network selection decisions.

In some demonstrative embodiments, node 104 may broadcast assistance information for UE 102 using additional or alternative rankings, which may account for quality of service classes, e.g., assistance information may be sent per QCI. This assistance information may be, for example, in the form of per QCI probability of network selection across the cellular networks and/or WLANs. In one example, UE 102 may be able to make WLAN QoS measurements on one or more particular quality of service classes, e.g., which may be mapped to 3GPP QCI, and UE 102 may report the measurements back to node 104. Node 104 may, for example, receive periodic reports from UE 102 and/or other UEs. Node 104 may assign, for example, probability of network selection per QCI, e.g., to result in selection of WLAN being blocked for Real-Time services, and allowed for best effort.

In some demonstrative embodiments, node 104 may use UE reports on "other detected" WLAN cells, for example, to discover neighboring WLAN APs available for network selection. According to these embodiments, node 104 may store this information regarding the neighboring WLAN APs. Node 104 may assist UE 102 in scanning for a select group of WLAN APs, for example, by providing WLAN network identifiers, channels, frequencies and/or other information relevant to the neighbor WLAN networks, thus saving on scan time and battery power of UE 102.

In some demonstrative embodiments, UE 102 may be configured to provide the WLAN measurement information and/or to perform access network selection, for example, when UE 102 is at the RRC Idle State.

For example, UE 102 may be in RRC Idle state "camped" on cell 103, while having one or more active connections on neighboring WLAN cells, e.g., WLAN 107. According to this example, UE 102 may use the network selection assistance information broadcast by node 104, e.g., as described above, to make RAT selection decisions. For example, node 104 may assess WLAN link information and provide the network selection assistance information, for example, based on WLAN measurement information from one or more other UEs, e.g., which may be associated with cell 103 or may at least have a partial set of bearers associated with the cellular link with node 104.

In some demonstrative embodiments, UE 102 may provide assistance information ("UE assistance information"), which may assist the network in making traffic steering decisions and/or provide improved "network assistance" to UEs for making traffic steering decision. UE 102 may provide the UE assistance information, e.g., even when at the RRC Idle State, for example, through piggy-backing on a random access RACH procedure, e.g., while performing location updates, or upon response to paging requests.

In some demonstrative embodiments, UE 102 use the RRCConnectionSetupRequest message with a Establishment Clause indicating WLAN overload, WLAN-QoS-Unacceptable, and the like.

In some demonstrative embodiments, UE may use the RRCConnectionSetupComplete message to provide the WLAN related information.

Figure 2:
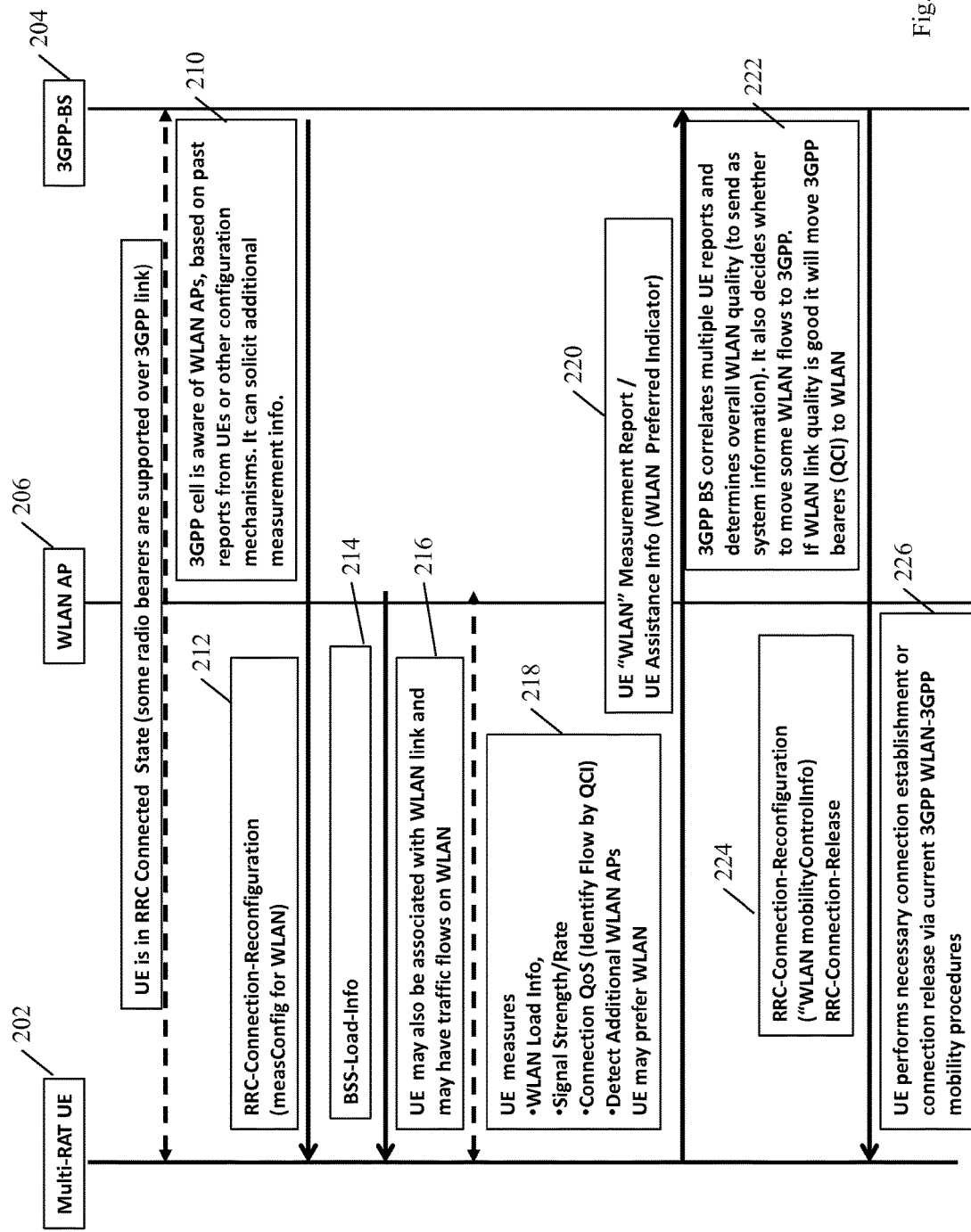
FIG. 2 is a schematic illustration of a sequence diagram of communicating Wireless Local Area Network (WLAN) measurement information and network selection of a User Equipment (UE) at a Connected state, in accordance with some demonstrative embodiments.

FIG. 2 schematically illustrates a sequence diagram of communicating WLAN measurement information and network selection of a UE 202 at an RRC Connected state with respect to a node 204, in accordance with some demonstrative embodiments. In some demonstrative embodiments, UE 202 may perform the functionality of UE 102 (FIG. 1) and/or node 204 may perform the functionality of node 104 (FIG. 1).

As indicated at box 210, in some demonstrative embodiments node 204 may be aware of at least one WLAN AP 206, for example, based on reports from one or more UEs and/or any other reporting and/or configuration mechanism.

In some demonstrative embodiments, node 204 may transmit an RRC message 212, e.g., a RRCConnectionReconfiguration message including the measConfig IE, including configuration information to configure WLAN measurements to be performed by UE 202 with respect to WLAN AP 206, e.g., as described above.

In some demonstrative embodiments, UE 202 may receive WLAN information, e.g., BSS Load information 214, from WLAN AP 206.

As indicated at box 216, in some demonstrative embodiments UE 202 may be associated with one or more WLAN links and/or communicate one or more traffic flows with WLAN AP 206.

As indicated by box 218, in some demonstrative embodiments UE 202 may perform WLAN measurements corresponding to WLAN AP 206, for example, based on the configuration information of RRC message 212, e.g., as described above.

In some demonstrative embodiments, UE 202 may transmit to node 204 a report message 220 including the WLAN measurement report, e.g., as described above.

In some demonstrative embodiments, report message 220 may optionally include any additional UE assistance information, e.g., including an indication that UE 202 prefers to use WLAN AP 206.

As indicated by box 222, in some demonstrative embodiments node 204 may make one or more network selection decisions with respect to UE 202, for example, based on the WLAN measurement information received from UE 202 and/or one or more other UEs, and/or based on load and/or quality information corresponding to the cell of node 204, e.g., as described above.

In some demonstrative embodiments, node 204 may transmit an RRC message 224 to trigger UE 202 to establish a connection or release a connection to a network, for example, to WLAN AP 206, e.g., as described above.

As indicated at box 226, in some demonstrative embodiments UE 202 may establish the connection or release the connection to the network based one the message 224, e.g., as described above.

Figure 3:
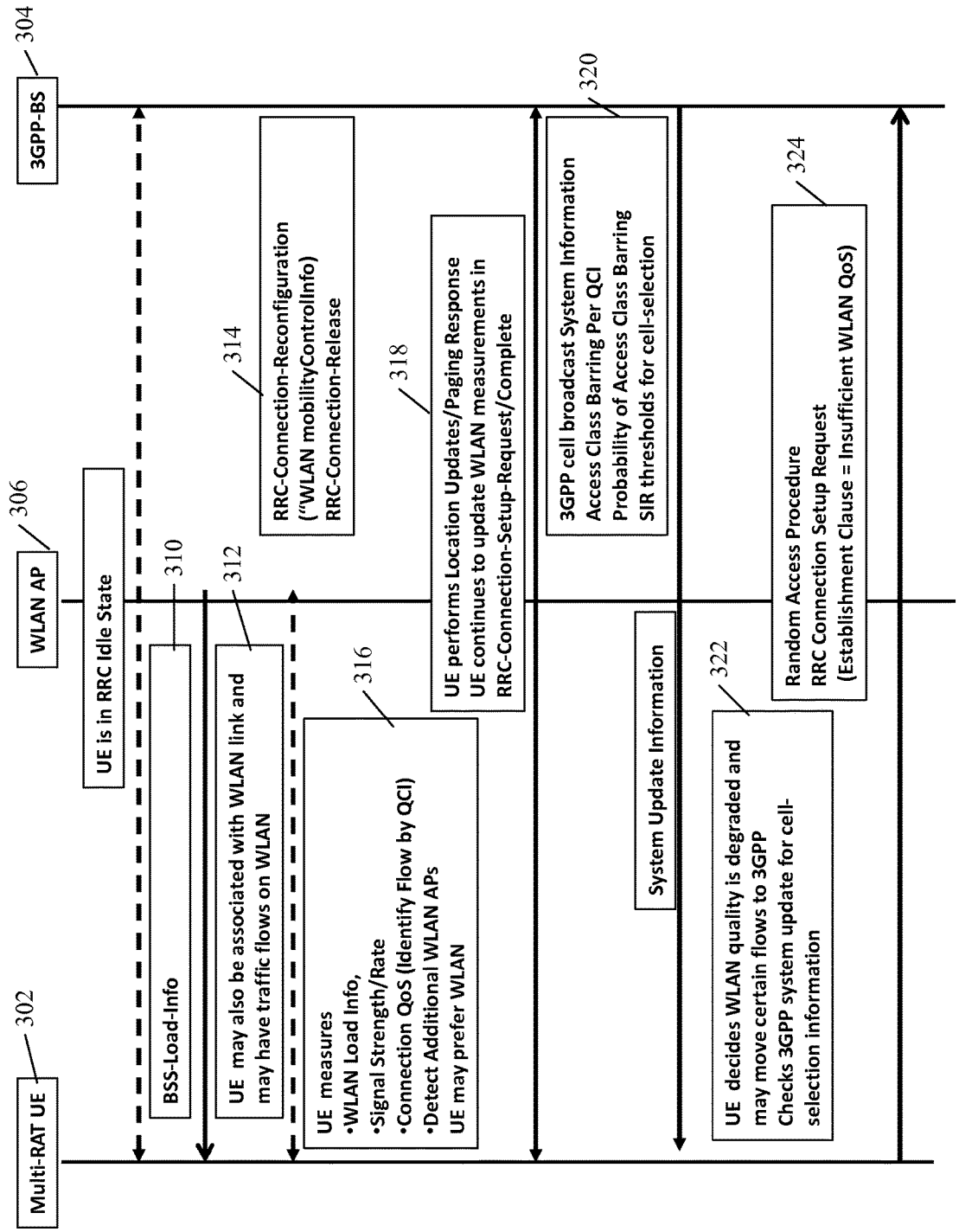
FIG. 3 is a schematic illustration of a sequence diagram of communicating WLAN measurement information and network selection of a UE at an Idle state, in accordance with some demonstrative embodiments.

FIG. 3 schematically illustrates a sequence diagram of communicating WLAN measurement information and network selection of a UE 302 at an RRC Idle state with respect to a node 304, in accordance with some demonstrative embodiments. In some demonstrative embodiments, UE 302 may perform the functionality of UE 102 (FIG. 1) and/or node 304 may perform the functionality of node 104 (FIG. 1).

In some demonstrative embodiments, UE 302 may receive WLAN information, e.g., BSS Load information 310, from at least one WLAN AP 306.

As indicated at box 312, in some demonstrative embodiments UE 302 may be associated with one or more WLAN links and/or communicate one or more traffic flows with WLAN AP 306.

In some demonstrative embodiments, node 304 may configure measurements at UE 302, for example, when UE 302 is initially connects to the cellular network. For example, a RRC message 314, e.g., a RRCConnectionReconfiguration message, may be transmitted by node 304, and may include configuration information to configure WLAN measurements to be performed by UEs with respect to WLAN AP 306, e.g., as described above. For example, UE 302 may continue to provide the measurement reports, e.g., periodically, for example, even while UE 302 is in Idle state. For example, UE 302 may provide the measurement reports by piggy-back measurements with location updates and/or paging responses, which may force UE 302 to move to the connected state. As indicated by box 316, in some demonstrative embodiments UE 302 may perform WLAN measurements corresponding to WLAN AP 306, e.g., as described above.

In some demonstrative embodiments, UE 302 may switch to the connected state, e.g., by performing a location update and/or any other procedure.

In some demonstrative embodiments, UE 302 may transmit to node 304 a report message 318 including the WLAN measurement report, e.g., as described above.

In some demonstrative embodiments, report message 318 may optionally include UE assistance information, e.g., including an indication that UE 302 prefers to use WLAN AP 306.

In some demonstrative embodiments node 304 may make one or more network selection decisions with respect to UE 302, for example, based on the WLAN measurement information received from UE 302 and/or one or more other UEs, and/or based on load and/or quality information corresponding to the cell of node 304, e.g., as described above.

In some demonstrative embodiments, node 304 may broadcast one or more messages 320 to assist access network selection by UE 302, e.g., as described above.

As indicated at box 322, in some demonstrative embodiments UE 302 select to move one or more flows to node 304, for example, based on messages 320 and/or one or more parameters of WLAN AP 306, e.g., as described above.

In some demonstrative embodiments, UE 302 may send a connection request to connect to node 304.

Figure 4:
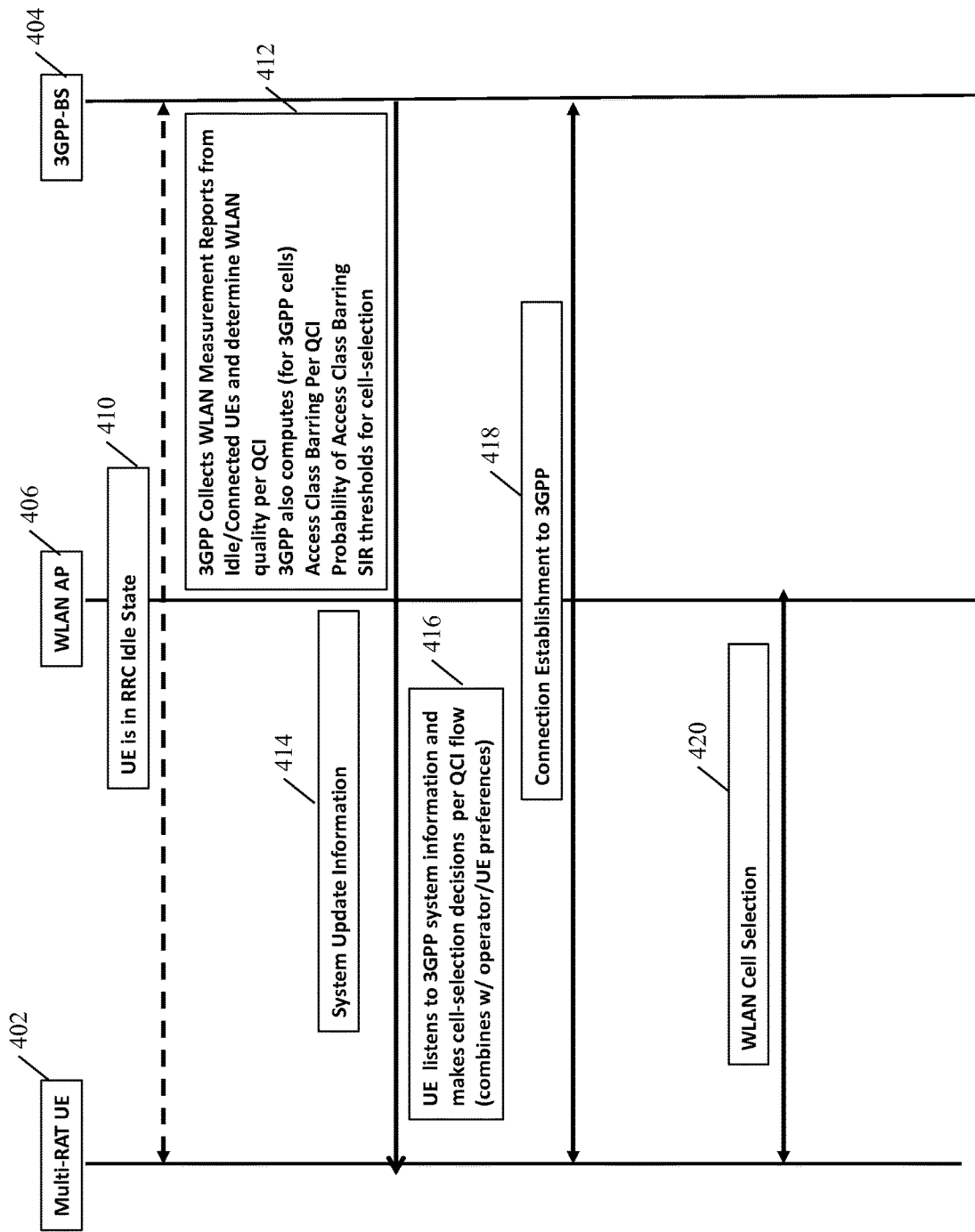
FIG. 4 is a schematic illustration of a sequence diagram of communicating network selection assistance information between a node and a UE, in accordance with some demonstrative embodiments.

FIG. 4 schematically illustrates a sequence diagram of communicating network selection assistance information between a node 404 and a UE 402, in accordance with some demonstrative embodiments. In some demonstrative embodiments, UE 402 may perform the functionality of UE 102 (FIG. 1) and/or node 404 may perform the functionality of node 104 (FIG. 1).

As indicated at box 410, in some demonstrative embodiments UE 402 may be either at the RRC Idle state or the RRC Connected State with respect to node 404.

As indicated at box 412, node 404 may determine one or more parameters corresponding to a WLAN AP 406, for example, based on WLAN measurement information received from one or more UEs, and/or based on load and/or quality information corresponding to the cell of node 404, e.g., as described above.

In some demonstrative embodiments, node 404 may transmit one or more messages 414 to assist access network selection by UE 402, e.g., as described above.

As indicated at box 416, in some demonstrative embodiments UE 404 may make a network selection decision, for example, based on messages 320, e.g., as described above.

In some demonstrative embodiments, UE 402 may send a connection request to connect to node 404, e.g., if UE 402 selects to connect to node 404.

In some demonstrative embodiments, UE 402 may send a connection request to connect to WLAN AP 420, e.g., if UE 402 selects to connect to WLAN AP 406.

Figure 5:
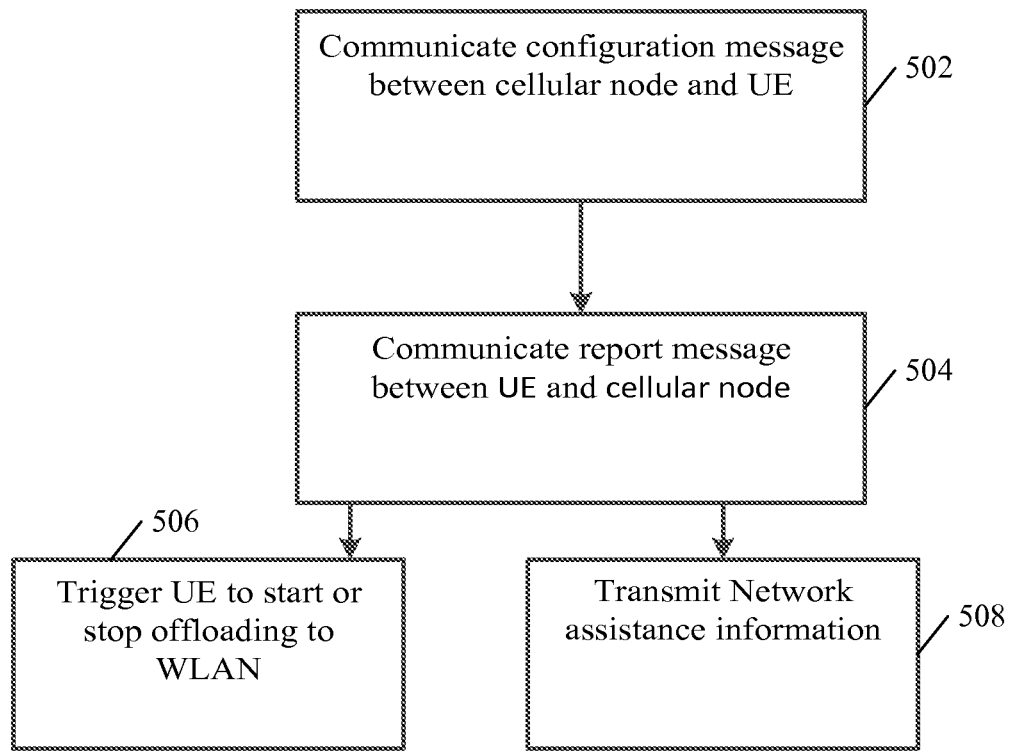
FIG. 5 is a schematic flow-chart illustration of a method of network selection, in accordance with some demonstrative embodiments.

Reference is made to FIG. 5, which schematically illustrates a method of network selection, in accordance with some demonstrative embodiments. In some embodiments, one or more of the operations of the method of FIG. 5 may be performed by a wireless communication system e.g., system 100 (FIG. 1); a wireless communication device, e.g., UE 102 (FIG. 1), node 104 (FIG. 1) and/or AP 106 (FIG. 1); and/or a wireless communication unit, e.g., wireless communication units 110 and/or 130 (FIG. 1).

As indicated at block 502, the method may include communicating between a cellular node and a wireless communication device at least one configuration message to configure one or more measurements to be performed by the wireless communication device with respect to at least one WLAN. For example, node 104 (FIG. 1) may transmit the configuration message to UE 102 (FIG. 1), e.g., as described above.

As indicated at block 504, the method may include communicating between the wireless communication device and the cellular node at least one report message including measurement information corresponding to the WLAN. For example, UE 102 (FIG. 1) may transmit the report message to 104 (FIG. 1), e.g., as described above.

As indicated at block 506, the method may include triggering the wireless communication device to start or stop offloading to the WLAN. For example, node 104 (FIG. 1) may transmit a message to trigger UE 102 (FIG. 1) to start or stop offloading to WLAN AP 106 (FIG. 1), e.g., as described above.

As indicated at block 508, the method may include communicating network assistance information corresponding to the WLAN between the cellular node and the wireless communication device. For example, node 104 (FIG. 1) may transmit a message including the network assistance information corresponding to WLAN AP 106 (FIG. 1), e.g., as described above.

Figure 6:
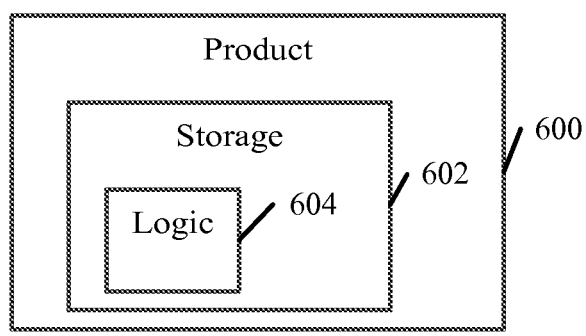
FIG. 6 is a schematic illustration of a product, in accordance with some demonstrative embodiments.

Reference is made to FIG. 6, which schematically illustrates a product of manufacture 300, in accordance with some demonstrative embodiments. Product 600 may include a non-transitory machine-readable storage medium 602 to store logic 604, which may be used, for example, to perform at least part of the functionality of UE 102 (FIG. 1), node 104 (FIG. 1), AP 106 (FIG. 1), wireless communication unit 110 (FIG. 1), wireless communication unit 130 (FIG. 1) to perform one or more operations of the procedures of FIGS. 2, 3 and/or 4, and/or to perform one or more operations of the method of FIG. 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a cellular node comprising a radio to transmit to a User Equipment (UE) at least one configuration message to configure one or more measurements to be performed by the UE with respect at least one Wireless Local Area Network (WLAN), and to receive from the UE at least one report message including measurement information corresponding to the WLAN.

Example 2 includes the subject matter of Example 1, and optionally, wherein the configuration message comprises at least one parameter selected from the group consisting of at least one identifier of the at least one WLAN, at least one frequency band of the at least one WLAN, and at least one frequency channel of the at least one WLAN.

Example 3 includes the subject matter of Example 2, and optionally, wherein the at least one identifier comprises at least one identifier selected from the group consisting of a Service Set Identification (SSID), an Extended SSID (ESSID), a Basic SSID (SSID), a Roaming Consortium, a Hotspot Operator Friendly Name, a Network Access Identifier (NAI) Home Realm, and a Mobility Domain.

Example 4 includes the subject matter of Example 2 or 3, and optionally, wherein the configuration message comprises a Measurement Information Element (IE) including the at least one parameter.

Example 5 includes the subject matter of any one of Examples 1-4, and optionally, wherein the configuration message comprises reporting configuration information defining at least one configuration selected from the group consisting of a reporting criterion defining a criterion to trigger the UE to send the report message, and a reporting format defining the measurement information.

Example 6 includes the subject matter of Example 5, and optionally, wherein the reporting criterion comprises a criterion related to at least one parameter selected from the group consisting of a Received Signal Strength Indicator (RSSI) threshold, a Received Channel Power Indicator (RCPI) threshold, a Received Power Indicator (RPI) threshold, a Received Signal to Noise Indicator (RSNI) threshold, and a WLAN channel utilization.

Example 7 includes the subject matter of any one of Examples 1-6, and optionally, wherein the configuration message comprises a Radio-Resource Control (RRC) signaling message.

Example 8 includes the subject matter of Example 7, and optionally, wherein the RRC signaling message comprises a RRCConnectionReconfiguration message.

Example 9 includes the subject matter of any one of Examples 1-8, and optionally, wherein the report message comprises at least one parameter selected from the group consisting of an identifier of the WLAN, a channel of the WLAN, a privacy parameter of the WLAN, a security parameter of the WLAN, a Received Signal Strength Indicator (RSSI) of the WLAN, a Received Channel Power Indicator (RCPI) of the WLAN, a Received Power Indicator (RPI) of the WLAN, a Received Signal to Noise Indicator (RSNI) threshold of the WLAN, a connection Quality of Service (QoS) of the WLAN, a load parameter indicating a load of the WLAN, and an indication of one or more other WLANs detected by the UE.

Example 10 includes the subject matter of any one of Examples 1-9, and optionally, wherein the report message comprises a Radio-Resource Control (RRC) signaling message.

Example 11 includes the subject matter of any one of Examples 1-10, and optionally, wherein the cellular node is to receive the report message when the UE is at a Radio-Resource Control (RRC) idle state.

Example 12 includes the subject matter of any one of Examples 1-10, and optionally, wherein the cellular node is to receive the report message when the UE is at a Radio-Resource Control (RRC) connected state.

Example 13 includes the subject matter of any one of Examples 1-12 and optionally comprising a controller to determine network assistance information corresponding to the at least one WLAN based on the measurement information, wherein the radio is to transmit a message including the network assistance information.

Example 14 includes the subject matter of Example 13, and optionally, wherein the radio is to broadcast the message including the network assistance information.

Example 15 includes the subject matter of Example 13, and optionally, wherein the radio is to transmit to another UE a dedicated message including the network assistance information.

Example 16 includes the subject matter of any one of Examples 13-15, and optionally, wherein the network assistance information represents a load or a quality of service of the WLAN.

Example 17 includes the subject matter of any one of Examples 1-12, and optionally, wherein the radio is to transmit a message to trigger the UE to start or stop offloading to the WLAN.

Example 18 includes the subject matter of Example 17, and optionally, wherein the radio is to transmit to the UE at least one control message including a predefined trigger to trigger the UE to start or stop offloading to the WLAN.

Example 19 includes the subject matter of Example 18, and optionally, wherein the control message comprises a Radio-Resource Control (RRC) signaling message.

Example 20 includes the subject matter of Example 19, and optionally, wherein the RRC signaling message comprises a DLInformationTransfer message, a RRCConnectionReconfiguration message, a HandoverFromEUTRAPreparationRequest message, a MobilityFromEUTRACommand message, a RRCConnectionRelease message, a RRCConnectionReject message, or a dedicated RRC message.

Example 21 includes the subject matter of any one of Examples 1-12, and optionally, wherein the radio is to transmit a message including a reselection frequency list including a plurality of WLAN frequencies associated with a plurality of cell reselection priorities, the WLAN frequencies including a WLAN frequency of the WLAN and a reselection priority of the WLAN is based on the measurement information.

Example 22 includes the subject matter of any one of Examples 1-12, and optionally, wherein, based on the measurement information the radio is to transmit a message including an access barring indication to bar the UE from using a cellular link with the cellular node.

Example 23 includes the subject matter of any one of Examples 1-22 and optionally comprising an Evolved Node B (eNB).

Example 24 includes a User Equipment (UE) comprising a Wireless Local Area Network (WLAN) transceiver; a cellular transceiver to receive from a cellular node at least one trigger message; and a controller to control access network selection of the UE with respect to a WLAN based on the trigger message.

Example 25 includes the subject matter of Example 24, and optionally, wherein the trigger message comprises a Radio-Resource Control (RRC) signaling message.

Example 26 includes the subject matter of Example 25, and optionally, wherein the RRC signaling message comprises a DLInformationTransfer message, a RRCConnectionReconfiguration message, a HandoverFromEUTRAPreparationRequest message, a MobilityFromEUTRACommand message, a RRCConnectionRelease message, a RRCConnectionReject message, or a dedicated RRC message.

Example 27 includes the subject matter of Example 24, and optionally, wherein the trigger message includes a reselection frequency list including a plurality of WLAN frequencies associated with a plurality of cell reselection priorities.

Example 28 includes the subject matter of Example 24, and optionally, wherein the trigger message comprises an access barring indication to bar the UE from using a cellular link with the cellular node, and wherein, in response to the access barring indication, the controller is to control the WLAN transceiver to connect to the WLAN.

Example 29 includes a cellular node comprising:
a radio to transmit to a User Equipment (UE) at least one Radio-Resource Control (RRC) signaling message including an offload trigger to trigger the UE to start or stop offloading to a WLAN.

Example 30 includes the subject matter of Example 29, and optionally, wherein the RRC signaling message comprises a DLInformationTransfer message, a RRCConnectionReconfiguration message, a HandoverFromEUTRAPreparationRequest message, a MobilityFromEUTRACommand message, a RRCConnectionRelease message, a RRCConnectionReject message, or a dedicated RRC message.

Example 31 includes the subject matter of Example 29 or 30 and optionally comprising a controller to control the radio to transmit the RRC message based on measurement information corresponding to the WLAN.

Example 32 includes the subject matter of Example 31, and optionally, wherein the radio is to receive the measurement information from the UE.

Example 33 includes the subject matter of Example 31, and optionally, wherein the radio is to receive the measurement information from another UE.

Example 34 includes the subject matter of any one of Examples 29-33 and optionally comprising an Evolved Node B (eNB).

Example 35 includes a cellular node comprising a radio to transmit a message including a reselection frequency list including a plurality of Wireless Local Are Network (WLAN) frequencies of one or more WLANS, and a plurality of cell reselection priorities prioritizing the WLAN frequencies.

Example 36 includes the subject matter of Example 35 and optionally comprising a controller to control the radio to transmit the message based on measurement information corresponding to the WLANs.

Example 37 includes the subject matter of Example 36, and optionally, wherein the radio is to receive the measurement information from a UE, and to transmit the message to the UE.

Example 38 includes the subject matter of Example 36, and optionally, wherein the radio is to transmit the message to a UE, and to receive the measurement information from another UE.

Example 39 includes the subject matter of any one of Examples 35-38, and optionally, wherein the message comprises a Radio-Resource Control (RRC) signaling message.

Example 40 includes the subject matter of Example 39, and optionally, wherein the RRC signaling message comprises a RRCConnectionRelease message.

Example 41 includes the subject matter of any one of Examples 35-40 and optionally comprising an Evolved Node B (eNB).

Example 42 includes a method comprising communicating between a cellular node and a User Equipment (UE) at least one configuration message to configure one or more measurements to be performed by the UE with respect at least one Wireless Local Area Network (WLAN); and communicating between the UE and the cellular node at least one report message including measurement information corresponding to the WLAN.

Example 43 includes the subject matter of Example 42, and optionally, wherein the configuration message comprises at least one parameter selected from the group consisting of at least one identifier of the at least one WLAN, at least one frequency band of the at least one WLAN, and at least one frequency channel of the at least one WLAN.

Example 44 includes the subject matter of Example 43, and optionally, wherein the at least one identifier comprises at least one identifier selected from the group consisting of a Service Set Identification (SSID), an Extended SSID (ESSID), a Basic SSID (SSID), a Roaming Consortium, a Hotspot Operator Friendly Name, a Network Access Identifier (NAI) Home Realm, and a Mobility Domain.

Example 45 includes the subject matter of Example 43 or 44, and optionally, wherein the configuration message comprises a Measurement Information Element (IE) including the at least one parameter.

Example 46 includes the subject matter of any one of Examples 42-45, and optionally, wherein the configuration message comprises reporting configuration information defining at least one configuration selected from the group consisting of a reporting criterion defining a criterion to trigger the UE to send the report message, and a reporting format defining the measurement information.

Example 47 includes the subject matter of Example 46, and optionally, wherein the reporting criterion comprises a criterion related to at least one parameter selected from the group consisting of a Received Signal Strength Indicator (RSSI) threshold, a Received Channel Power Indicator (RCPI) threshold, a Received Power Indicator (RPI) threshold, a Received Signal to Noise Indicator (RSNI) threshold, and a WLAN channel utilization.

Example 48 includes the subject matter of any one of Examples 42-47, and optionally, wherein the configuration message comprises a Radio-Resource Control (RRC) signaling message.

Example 49 includes the subject matter of Example 48, and optionally, wherein the RRC signaling message comprises a RRCConnectionReconfiguration message.

Example 50 includes the subject matter of any one of Examples 42-49, and optionally, wherein the report message comprises at least one parameter selected from the group consisting of an identifier of the WLAN, a channel of the WLAN, a privacy parameter of the WLAN, a security parameter of the WLAN, a Received Signal Strength Indicator (RSSI) of the WLAN, a Received Channel Power Indicator (RCPI) of the WLAN, a Received Power Indicator (RPI) of the WLAN, a Received Signal to Noise Indicator (RSNI) threshold of the WLAN, a connection Quality of Service (QoS) of the WLAN, a load parameter indicating a load of the WLAN, and an indication of one or more other WLANs detected by the UE.

Example 51 includes the subject matter of any one of Examples 42-50, and optionally, wherein the report message comprises a Radio-Resource Control (RRC) signaling message.

Example 52 includes the subject matter of any one of Examples 42-51 and optionally comprising communicating the report message when the UE is at a Radio-Resource Control (RRC) idle state.

Example 53 includes the subject matter of any one of Examples 42-51 and optionally comprising communicating the report message when the UE is at a Radio-Resource Control (RRC) connected state.

Example 54 includes the subject matter of any one of Examples 42-53 and optionally comprising determining network assistance information corresponding to the at least one WLAN based on the measurement information, and transmitting a message including the network assistance information.

Example 55 includes the subject matter of Example 54 and optionally comprising broadcasting the message including the network assistance information.

Example 56 includes the subject matter of Example 54 and optionally comprising transmitting to another UE a dedicated message including the network assistance information.

Example 57 includes the subject matter of any one of Examples 54-56, and optionally, wherein the network assistance information represents a load or a quality of service of the WLAN.

Example 58 includes the subject matter of any one of Examples 42-53 and optionally comprising communicating between the cellular node and the UE a message to trigger the UE to start or stop offloading to the WLAN.

Example 59 includes the subject matter of Example 58 and optionally comprising communicating between the cellular node and the UE at least one control message including a predefined trigger to trigger the UE to start or stop offloading to the WLAN.

Example 60 includes the subject matter of Example 59, and optionally, wherein the control message comprises a Radio-Resource Control (RRC) signaling message.

Example 61 includes the subject matter of Example 60, and optionally, wherein the RRC signaling message comprises a DLInformationTransfer message, a RRCConnectionReconfiguration message, a HandoverFromEUTRAPreparationRequest message, a MobilityFromEUTRACommand message, a RRCConnectionRelease message, a RRCConnectionReject message, or a dedicated RRC message.

Example 62 includes the subject matter of any one of Examples 42-53 and optionally comprising transmitting a message including a reselection frequency list including a plurality of WLAN frequencies associated with a plurality of cell reselection priorities, the WLAN frequencies including a WLAN frequency of the WLAN and a reselection priority of the WLAN is based on the measurement information.

Example 63 includes the subject matter of any one of Examples 42-53 and optionally comprising, based on the measurement information, transmitting a message including an access barring indication to bar the UE from using a cellular link with the cellular node.

Example 64 includes the subject matter of any one of Examples 42-63, and optionally, wherein the cellular node comprises an Evolved Node B (eNB).

Example 65 includes a method comprising receiving at a User Equipment (UE) at least one trigger message from a cellular node over a cellular link; and controlling access network selection of the UE with respect to a Wireless Local Area Network (WLAN) based on the trigger message.

Example 66 includes the subject matter of Example 65, and optionally, wherein the trigger message comprises a Radio-Resource Control (RRC) signaling message.

Example 67 includes the subject matter of Example 66, and optionally, wherein the RRC signaling message comprises a DLInformationTransfer message, a RRCConnectionReconfiguration message, a HandoverFromEUTRAPreparationRequest message, a MobilityFromEUTRACommand message, a RRCConnectionRelease message, a RRCConnectionReject message, or a dedicated RRC message.

Example 68 includes the subject matter of Example 65, and optionally, wherein the trigger message includes a reselection frequency list including a plurality of WLAN frequencies associated with a plurality of cell reselection priorities.

Example 69 includes the subject matter of Example 65, and optionally, wherein the trigger message comprises an access barring indication to bar the UE from using a cellular link with the cellular node, and wherein the method comprises, in response to the access barring indication, controlling the UE connect to the WLAN.

Example 70 includes a method comprising communicating between a cellular node and a User Equipment (UE) at least one Radio-Resource Control (RRC) signaling message including an offload trigger to trigger the UE to start or stop offloading to a WLAN.

Example 71 includes the subject matter of Example 70, and optionally, wherein the RRC signaling message comprises a DLInformationTransfer message, a RRCConnectionReconfiguration message, a HandoverFromEUTRAPreparationRequest message, a MobilityFromEUTRACommand message, a RRCConnectionRelease message, a RRCConnectionReject message, or a dedicated RRC message.

Example 72 includes the subject matter of Example 70 or 71 and optionally comprising transmitting the RRC message based on measurement information corresponding to the WLAN.

Example 73 includes the subject matter of Example 72 and optionally comprising receiving the measurement information from the UE.

Example 74 includes the subject matter of Example 72 and optionally comprising receiving the measurement information from another UE.

Example 75 includes a method comprising transmitting from a cellular node a message including a reselection frequency list including a plurality of Wireless Local Are Network (WLAN) frequencies of one or more WLANS, and a plurality of cell reselection priorities prioritizing the WLAN frequencies.

Example 76 includes the subject matter of Example 75 and optionally comprising transmitting the message based on measurement information corresponding to the WLANs.

Example 77 includes the subject matter of Example 76 and optionally comprising receiving the measurement information from a UE, and transmitting the message to the UE.

Example 78 includes the subject matter of Example 76 and optionally comprising transmitting the message to a UE and receiving the measurement information from another UE.

Example 79 includes the subject matter of any one of Examples 75-78, and optionally, wherein the message comprises a Radio-Resource Control (RRC) signaling message.

Example 80 includes the subject matter of Example 79, and optionally, wherein the RRC signaling message comprises a RRCConnectionRelease message.

Example 81 includes a product including a non-transitory storage medium having stored thereon instructions that, when executed by a machine, result in communicating between a cellular node and a User Equipment (UE) at least one configuration message to configure one or more measurements to be performed by the UE with respect at least one Wireless Local Area Network (WLAN); and communicating between the UE and the cellular node at least one report message including measurement information corresponding to the WLAN.

Example 82 includes the subject matter of Example 89, and optionally, wherein the configuration message comprises at least one parameter selected from the group consisting of at least one identifier of the at least one WLAN, at least one frequency band of the at least one WLAN, and at least one frequency channel of the at least one WLAN.

Example 83 includes the subject matter of Example 82, and optionally, wherein the at least one identifier comprises at least one identifier selected from the group consisting of a Service Set Identification (SSID), an Extended SSID (ESSID), a Basic SSID (SSID), a Roaming Consortium, a Hotspot Operator Friendly Name, a Network Access Identifier (NAI) Home Realm, and a Mobility Domain.

Example 84 includes the subject matter of Example 82 or 83, and optionally, wherein the configuration message comprises a Measurement Information Element (IE) including the at least one parameter.

Example 85 includes the subject matter of any one of Examples 81-84, and optionally, wherein the configuration message comprises reporting configuration information defining at least one configuration selected from the group consisting of a reporting criterion defining a criterion to trigger the UE to send the report message, and a reporting format defining the measurement information.

Example 86 includes the subject matter of Example 85, and optionally, wherein the reporting criterion comprises a criterion related to at least one parameter selected from the group consisting of a Received Signal Strength Indicator (RSSI) threshold, a Received Channel Power Indicator (RCPI) threshold, a Received Power Indicator (RPI) threshold, a Received Signal to Noise Indicator (RSNI) threshold, and a WLAN channel utilization.

Example 87 includes the subject matter of any one of Examples 81-86, and optionally, wherein the configuration message comprises a Radio-Resource Control (RRC) signaling message.

Example 88 includes the subject matter of Example 87, and optionally, wherein the RRC signaling message comprises a RRCConnectionReconfiguration message.

Example 89 includes the subject matter of any one of Examples 81-88, and optionally, wherein the report message comprises at least one parameter selected from the group consisting of an identifier of the WLAN, a channel of the WLAN, a privacy parameter of the WLAN, a security parameter of the WLAN, a Received Signal Strength Indicator (RSSI) of the WLAN, a Received Channel Power Indicator (RCPI) of the WLAN, a Received Power Indicator (RPI) of the WLAN, a Received Signal to Noise Indicator (RSNI) threshold of the WLAN, a connection Quality of Service (QoS) of the WLAN, a load parameter indicating a load of the WLAN, and an indication of one or more other WLANs detected by the UE.

Example 90 includes the subject matter of any one of Examples 81-89, and optionally, wherein the report message comprises a Radio-Resource Control (RRC) signaling message.

Example 91 includes the subject matter of any one of Examples 81-90, and optionally, wherein the instructions result in communicating the report message when the UE is at a Radio-Resource Control (RRC) idle state.

Example 92 includes the subject matter of any one of Examples 81-90, and optionally, wherein the instructions result in communicating the report message when the UE is at a Radio-Resource Control (RRC) connected state.

Example 93 includes the subject matter of any one of Examples 81-92, and optionally, wherein the instructions result in determining network assistance information corresponding to the at least one WLAN based on the measurement information, and transmitting a message including the network assistance information.

Example 94 includes the subject matter of Example 93, and optionally, wherein the instructions result in broadcasting the message including the network assistance information.

Example 95 includes the subject matter of Example 93, and optionally, wherein the instructions result in transmitting to another UE a dedicated message including the network assistance information.

Example 96 includes the subject matter of any one of Examples 93-95, and optionally, wherein the network assistance information represents a load or a quality of service of the WLAN.

Example 97 includes the subject matter of any one of Examples 81-92, and optionally, wherein the instructions result in communicating between the cellular node and the UE a message to trigger the UE to start or stop offloading to the WLAN.

Example 98 includes the subject matter of Example 97, and optionally, wherein the instructions result in communicating between the cellular node and the UE at least one control message including a predefined trigger to trigger the UE to start or stop offloading to the WLAN.

Example 99 includes the subject matter of Example 98, and optionally, wherein the control message comprises a Radio-Resource Control (RRC) signaling message.

Example 100 includes the subject matter of Example 99, and optionally, wherein the RRC signaling message comprises a DLInformationTransfer message, a RRCConnectionReconfiguration message, a HandoverFromEUTRAPreparationRequest message, a MobilityFromEUTRACommand message, a RRCConnectionRelease message, a RRCConnectionReject message, or a dedicated RRC message.

Example 101 includes the subject matter of any one of Examples 81-92, and optionally, wherein the instructions result in transmitting a message including a reselection frequency list including a plurality of WLAN frequencies associated with a plurality of cell reselection priorities, the WLAN frequencies including a WLAN frequency of the WLAN and a reselection priority of the WLAN is based on the measurement information.

Example 102 includes the subject matter of any one of Examples 81-92, and optionally, wherein the instructions result in, based on the measurement information, transmitting a message including an access barring indication to bar the UE from using a cellular link with the cellular node.

Example 103 includes the subject matter of any one of Examples 81-102, and optionally, wherein the cellular node comprises an Evolved Node B (eNB).

Example 104 includes a product including a non-transitory storage medium having stored thereon instructions that, when executed by a machine, result in receiving at a User Equipment (UE) at least one trigger message from a cellular node over a cellular link; and controlling access network selection of the UE with respect to a Wireless Local Area Network (WLAN) based on the trigger message.

Example 105 includes the subject matter of Example 104, and optionally, wherein the trigger message comprises a Radio-Resource Control (RRC) signaling message.

Example 106 includes the subject matter of Example 105, and optionally, wherein the RRC signaling message comprises a DLInformationTransfer message, a RRCConnectionReconfiguration message, a HandoverFromEUTRAPreparationRequest message, a MobilityFromEUTRACommand message, a RRCConnectionRelease message, a RRCConnectionReject message, or a dedicated RRC message.

Example 107 includes the subject matter of Example 104, and optionally, wherein the trigger message includes a reselection frequency list including a plurality of WLAN frequencies associated with a plurality of cell reselection priorities.

Example 108 includes the subject matter of Example 104, and optionally, wherein the trigger message comprises an access barring indication to bar the UE from using a cellular link with the cellular node, and wherein the instructions result in controlling the UE connect to the WLAN, in response to the access barring indication.

Example 109 includes a product including a non-transitory storage medium having stored thereon instructions that, when executed by a machine, result in communicating between a cellular node and a User Equipment (UE) at least one Radio-Resource Control (RRC) signaling message including an offload trigger to trigger the UE to start or stop offloading to a WLAN.

Example 110 includes the subject matter of Example 109, and optionally, wherein the RRC signaling message comprises a DLInformationTransfer message, a RRCConnectionReconfiguration message, a HandoverFromEUTRAPreparationRequest message, a MobilityFromEUTRACommand message, a RRCConnectionRelease message, a RRCConnectionReject message, or a dedicated RRC message.

Example 111 includes the subject matter of Example 109 or 110, and optionally, wherein the instructions result in transmitting the RRC message based on measurement information corresponding to the WLAN.

Example 112 includes the subject matter of Example 111, and optionally, wherein the instructions result in receiving the measurement information from the UE.

Example 113 includes the subject matter of Example 111, and optionally, wherein the instructions result in receiving the measurement information from another UE.

Example 114 includes a product including a non-transitory storage medium having stored thereon instructions that, when executed by a machine, result in transmitting from a cellular node a message including a reselection frequency list including a plurality of Wireless Local Are Network (WLAN) frequencies of one or more WLANS, and a plurality of cell reselection priorities prioritizing the WLAN frequencies.

Example 115 includes the subject matter of Example 114, and optionally, wherein the instructions result in transmitting the message based on measurement information corresponding to the WLANs.

Example 116 includes the subject matter of Example 115, and optionally, wherein the instructions result in receiving the measurement information from a UE, and transmitting the message to the UE.

Example 117 includes the subject matter of Example 115, and optionally, wherein the instructions result in transmitting the message to a UE and receiving the measurement information from another UE.

Example 118 includes the subject matter of any one of Examples 114-117, and optionally, wherein the message comprises a Radio-Resource Control (RRC) signaling message.

Example 119 includes the subject matter of Example 118, and optionally, wherein the RRC signaling message comprises a RRCConnectionRelease message.

Example 120 includes an Evolved Node B (eNB) comprising a radio; and a controller to control the radio to transmit to one or more User Equipment (UEs) at least one Radio-Resource Control (RRC) configuration message to configure one or more measurements to be performed by the UEs with respect to one or more Wireless Local Area Network (WLANs), and to receive from the one or more UEs one or more RRC report messages including measurement information corresponding to the one or more WLANs, wherein, based on the measurement information, the controller is to control the radio to transmit to at least one UE a RRC trigger message including an offload trigger to trigger the UE to start or stop offloading to a WLAN of the one or more WLANs.

Example 121 includes the subject matter of example 120 and, optionally wherein the RRC trigger message comprises a DLInformationTransfer message, a RRCConnectionReconfiguration message, a HandoverFromEUTRAPreparationRequest message, a MobilityFromEUTRACommand message, a RRCConnectionRelease message, a RRCConnectionReject message, or a dedicated RRC message.

Example 122 includes the subject matter of example 120 or 121 and, optionally wherein the controller is to determine network assistance information corresponding to one or more WLANs based on the measurement information, and to control the radio to transmit at least one RRC message including the network assistance information.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A cellular node comprising: a radio to transmit to a User Equipment (UE) at least one configuration message to configure one or more measurements to be performed by said UE with respect at least one Wireless Local Area Network (WLAN), and to receive from the UE at least one report message including measurement information corresponding to said WLAN, said configuration message comprises reporting configuration information defining at least one of a reporting criterion or a reporting format, the reporting criterion defining a criterion to trigger said UE to send said report message, the reporting format defining said measurement information; and a controller to determine network assistance information corresponding to said at least one WLAN based on said measurement information, wherein said radio is to transmit a message including said network assistance information.

2. The cellular node of claim 1, wherein said configuration message comprises at least one parameter selected from the group consisting of at least one identifier of said at least one WLAN, at least one frequency band of said at least one WLAN, and at least one frequency channel of said at least one WLAN.

3. The cellular node of claim 2, wherein said at least one identifier comprises at least one identifier selected from the group consisting of a Service Set Identification (SSID), an Extended SSID (ESSID), a Basic SSID (SSID), a Roaming Consortium, a Hotspot Operator Friendly Name, a Network Access Identifier (NAI) Home Realm, and a Mobility Domain.

4. The cellular node of claim 1, wherein said configuration message comprises a Radio-Resource Control (RRC) signaling message.

5. The cellular node of claim 1, wherein said report message comprises at least one parameter selected from the group consisting of an identifier of said WLAN, a channel of said WLAN, a privacy parameter of said WLAN, a security parameter of said WLAN, a Received Signal Strength Indicator (RSSI) of said WLAN, a Received Channel Power Indicator (RCPI) of said WLAN, a Received Power Indicator (RPI) of said WLAN, a Received Signal to Noise Indicator (RSNI) threshold of said WLAN, a connection Quality of Service (QoS) of said WLAN, a load parameter indicating a load of said WLAN, and an indication of one or more other WLANs detected by said UE.

6. The cellular node of claim 1, wherein said report message comprises a Radio-Resource Control (RRC) signaling message.

7. The cellular node of claim 1, wherein said cellular node is to receive said report message when said UE is at a Radio-Resource Control (RRC) idle state.

8. The cellular node of claim 1, wherein said radio is to transmit a message to trigger said UE to start or stop offloading to said WLAN.

9. The cellular node of claim 1, wherein said radio is to transmit a message including a reselection frequency list including a plurality of WLAN frequencies associated with a plurality of cell reselection priorities, said WLAN frequencies including a WLAN frequency of said WLAN and a reselection priority of said WLAN is based on said measurement information.

10. The cellular node of claim 1, wherein, based on said measurement information said radio is to transmit a message including an access barring indication to bar said UE from using a cellular link with said cellular node.

11. A User Equipment (UE) comprising:
a Wireless Local Area Network (WLAN) transceiver;
a cellular transceiver to receive from a cellular node at least one trigger message; and a controller to control access network selection of said UE with respect to a WLAN based on said trigger message, wherein, when said trigger message comprises an access barring indication to bar said UE from using a cellular link with said cellular node, said controller is to control said WLAN transceiver to connect to said WLAN.

12. The UE of claim 11, wherein said trigger message comprises a Radio-Resource Control (RRC) signaling message.

13. The UE of claim 12, wherein said RRC signaling message comprises a DLInformationTransfer message, a RRCConnectionReconfiguration message, a HandoverFromEUTRAPreparationRequest message, a MobilityFromEUTRACommand message, a RRCConnectionRelease message, a RRCConnectionReject message, or a dedicated RRC message.

14. The UE of claim 11, wherein said trigger message includes a reselection frequency list including a plurality of WLAN frequencies associated with a plurality of cell reselection priorities.

15. An Evolved Node B (eNB) comprising: a radio; and a controller to control said radio to transmit to one or more User Equipment (UEs) at least one Radio-Resource Control (RRC) configuration message to configure one or more measurements to be performed by said UEs with respect to one or more Wireless Local Area Network (WLANs), and to receive from the one or more UEs one or more RRC report messages including measurement information corresponding to said one or more WLANs, said controller is to determine network assistance information corresponding to said one or more WLANs based on said measurement information, said controller to control said radio to transmit at least one RRC message including said network assistance information, wherein, based on said measurement information, said controller is to control said radio to transmit to at least one UE a RRC trigger message including an offload trigger to trigger said UE to start or stop offloading to a WLAN of said one or more WLANs.

16. The eNB of claim 15, wherein said RRC trigger message comprises a DLInformationTransfer message, a RRCConnectionReconfiguration message, a HandoverFromEUTRAPreparationRequest message, a MobilityFromEUTRACommand message, a RRCConnectionRelease message, a RRCConnectionReject message, or a dedicated RRC message.

17. A method comprising: communicating between a cellular node and a User Equipment (UE) at least one configuration message to configure one or more measurements to be performed by said UE with respect at least one Wireless Local Area Network (WLAN), said configuration message comprises reporting configuration information defining at least one of a reporting condition or a reporting format, the reporting criterion defining a criterion to trigger said UE to send at least one report message, the reporting format defining measurement information corresponding to said WLAN, wherein said configuration message comprises a Radio-Resource Control (RRC) signaling message; and communicating between the UE and the cellular node the at least one report message including the measurement information corresponding to said WLAN.

18. The method of claim 17, wherein said configuration message comprises at least one parameter selected from the group consisting of at least one identifier of said at least one WLAN, at least one frequency band of said at least one WLAN, and at least one frequency channel of said at least one WLAN.

19. The method of claim 17, comprising transmitting the configuration message from the cellular node to the UE, and receiving the report message from the UE at the cellular node.

20. A product including a non-transitory storage medium having stored thereon instructions that, when executed by a machine, result in: receiving at a cellular node measurement information from a first User Equipment (UE), the measurement information corresponding to one or more Wireless Local Area Networks (WLANs); and based on the measurement information, transmitting from the cellular node to at least a second UE a message including a reselection frequency list including a plurality of WLAN frequencies of the one or more WLANs, and a plurality of cell reselection priorities prioritizing said plurality of WLAN frequencies.

21. The product of claim 20, wherein the instructions result in transmitting said message to said first UE.

22. The product of claim 20, wherein said message comprises a Radio-Resource Control (RRC) signaling message.

23. The product of claim 22, wherein said RRC signaling message comprises a RRCConnectionRelease message.

* * * * *